US012621029B2

(12) United States Patent
Shen et al.

(10) Patent No.: US 12,621,029 B2
(45) Date of Patent: May 5, 2026

(54) BEAM INFORMATION REPORTING AND RECEIVING METHOD AND APPARATUS

(71) Applicant: Huawei Technologies Co., Ltd., Shenzhen (CN)

(72) Inventors: Zhongyi Shen, Beijing (CN); Li Zhang, Beijing (CN); Jing Han, Beijing (CN); Hong Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 154 days.

(21) Appl. No.: 18/352,000

(22) Filed: Jul. 13, 2023

(65) Prior Publication Data

US 2023/0361835 A1 Nov. 9, 2023

Related U.S. Application Data

(63) Continuation of application No. PCT/CN2021/071667, filed on Jan. 14, 2021.

(51) Int. Cl.
| | |
|---|---|
| *H04W 72/20* | (2023.01) |
| *H04B 7/06* | (2006.01) |
| *H04L 5/00* | (2006.01) |

(52) U.S. Cl.
CPC ......... *H04B 7/0626* (2013.01); *H04L 5/0094* (2013.01); *H04W 72/20* (2023.01)

(58) Field of Classification Search
CPC ..... H04B 7/0626; H04W 72/20; H04L 5/0094
USPC ........................................................ 370/329
See application file for complete search history.

(56) References Cited

U.S. PATENT DOCUMENTS

| | | | | |
|---|---|---|---|---|
| 11,323,231 B2 * | 5/2022 | Papasakellariou ... | H04B 7/0626 |
| 11,336,357 B2 * | 5/2022 | Koskela ................. | H04W 16/28 |
| 11,659,497 B2 * | 5/2023 | Kim ........................ | H04L 5/001 |
| | | | 370/329 |

(Continued)

FOREIGN PATENT DOCUMENTS

| | | |
|---|---|---|
| CN | 109314871 A | 2/2019 |
| CN | 111385078 A | 7/2020 |

(Continued)

OTHER PUBLICATIONS

3GPP TSG RAN WG1 Meeting#103-e,R1-2008322,"Discussion on efficient activation/de-activation mechanism for SCells",Huawei,HiSilicon,Oct. 26-Nov. 11, 2020, total 8 pages.

(Continued)

*Primary Examiner* — Anthony Mejia
(74) *Attorney, Agent, or Firm* — Slater Matsil, LLP

(57) ABSTRACT

A beam information reporting and receiving method and apparatus are disclosed. The method at least includes: A terminal device receives first activation signaling from a network device, where the first activation signaling is used to activate a first cell, and the first cell is a secondary cell that has a capability of sending a physical uplink control channel PUCCH. The terminal device measures a reference signal of the first cell to determine beam information of the first cell. The terminal device sends layer 2 signaling to the network device by using a second cell, where the layer 2 signaling includes the beam information of the first cell, and the second cell is a primary cell or a primary secondary cell corresponding to the first cell.

20 Claims, 7 Drawing Sheets

<u>100</u>

Terminal device 120

Terminal device 120

Network device 110

(56) References Cited

U.S. PATENT DOCUMENTS

| | | | | |
|---|---|---|---|---|
| 11,664,957 | B2 * | 5/2023 | Dinan | H04L 5/0053 |
| | | | | 370/329 |
| 11,671,227 | B2 * | 6/2023 | Dinan | H04W 72/23 |
| | | | | 370/329 |
| 11,770,776 | B2 * | 9/2023 | Ekpenyong | H04W 74/0833 |
| | | | | 370/329 |
| 12,167,291 | B2 * | 12/2024 | Huang | H04W 24/08 |
| 12,302,155 | B2 * | 5/2025 | Liu | H04W 8/183 |
| 2018/0270735 | A1 | 9/2018 | Dinan | |
| 2021/0167839 | A1 * | 6/2021 | Zhang | H04L 5/0094 |
| 2022/0045738 | A1 * | 2/2022 | He | H04B 7/0617 |
| 2023/0041095 | A1 * | 2/2023 | Zhou | H04L 5/0057 |
| 2023/0164822 | A1 * | 5/2023 | Faxér | H04W 72/54 |
| | | | | 370/329 |
| 2023/0180285 | A1 * | 6/2023 | Cui | H04W 74/002 |
| | | | | 370/329 |
| 2023/0209555 | A1 * | 6/2023 | Sosnin | H04L 5/0053 |
| | | | | 370/329 |
| 2023/0361835 | A1 * | 11/2023 | Shen | H04L 5/0094 |
| 2024/0237004 | A1 * | 7/2024 | Koorapaty | H04W 88/023 |
| 2024/0259257 | A1 * | 8/2024 | Cirik | H04W 24/08 |

FOREIGN PATENT DOCUMENTS

| | | | |
|---|---|---|---|
| CN | 112055374 A | 12/2020 | |
| JP | 2018515951 A | 6/2018 | |
| JP | 2019057911 A | 4/2019 | |
| JP | 2020523895 A | 8/2020 | |
| WO | 2017033091 A1 | 3/2017 | |
| WO | WO-2024234200 A1 * | 11/2024 | H04W 36/00 |

OTHER PUBLICATIONS

3GPP TSG RAN WG1 Meeting#103-e,R1-2008832,"Discussion on Supporting Efficient Activation/De-activation Mechanism for SCells in NR CA",ZTE,Oct. 26-Nov. 13, 2020,total 13 pages.

3GPP TSG RAN WG1 Meeting#103-e,R1-2008968,"On supporting efficient activation mechanism for SCells in NR CA",MediaTek Inc,Oct. 26-Nov. 13, 2020,total 7 pages.

3GPP TSG RAN WG2 Meeting#1113-e,R2-2100058,"LS on TCI state indication at Direct SCell activation",RAN WG4, Jan. 25-Feb. 5, 2021,total 3 pages.

3rd Generation Partnership Project; Technical Specification Group Radio Access Network; NR; Requirements for support of radio resource management (Release 16), 3GPP TS 38.133 V16.1.0 (Sep. 2019), Technical Specification, total 1040 pages.

Nokia Corporation (Rapporteur):"Running 36.300 CR to capture agreements on carrier aggregation enhancements", 3GPP TSG-RAN WG2 Meeting #90 Fukuoka, Japan, May 25-29, 2015, R2-152855, total 5 pages.

3rd Generation Partnership Project; Technical Specification Group Radio Access Network; Evolved Universal Terrestrial Radio Access (E-UTRA); Requirements for support of radio resource management (Release 16), 3GPP TS 36.133 V16.8.0 (Dec. 2020), Technical Specification, total 3982 pages.

3rd Generation Partnership Project; Technical Specification Group Radio Access Network; NR; Medium Access Control (MAC) protocol specification (Release 16), 3GPP TS 38.321 V16.3.0 (Dec. 2020), total 156 pages.

3rd Generation Partnership Project; Technical Specification Group Radio Access Network; NR; Physical channels and modulation (Release 16), 3GPP TS 38.211 V16.4.0 (Dec. 2020), Technical Specification, total 133 pages.

3rd Generation Partnership Project; Technical Specification Group Radio Access Network; NR; User Equipment (UE) radio access capabilities (Release 16), 3GPP TS 38.306 V16.3.0 (Dec. 2020), Technical Specification, total 135 pages.

3rd Generation Partnership Project; Technical Specification Group Radio Access Network; NR; Physical layer procedures for control (Release 16), 3GPP TS 38.213 V16.3.0 (Sep. 2020), Technical Specification, total 179 pages.

* cited by examiner

100

Terminal device 120

Terminal device 120

Network
device 110

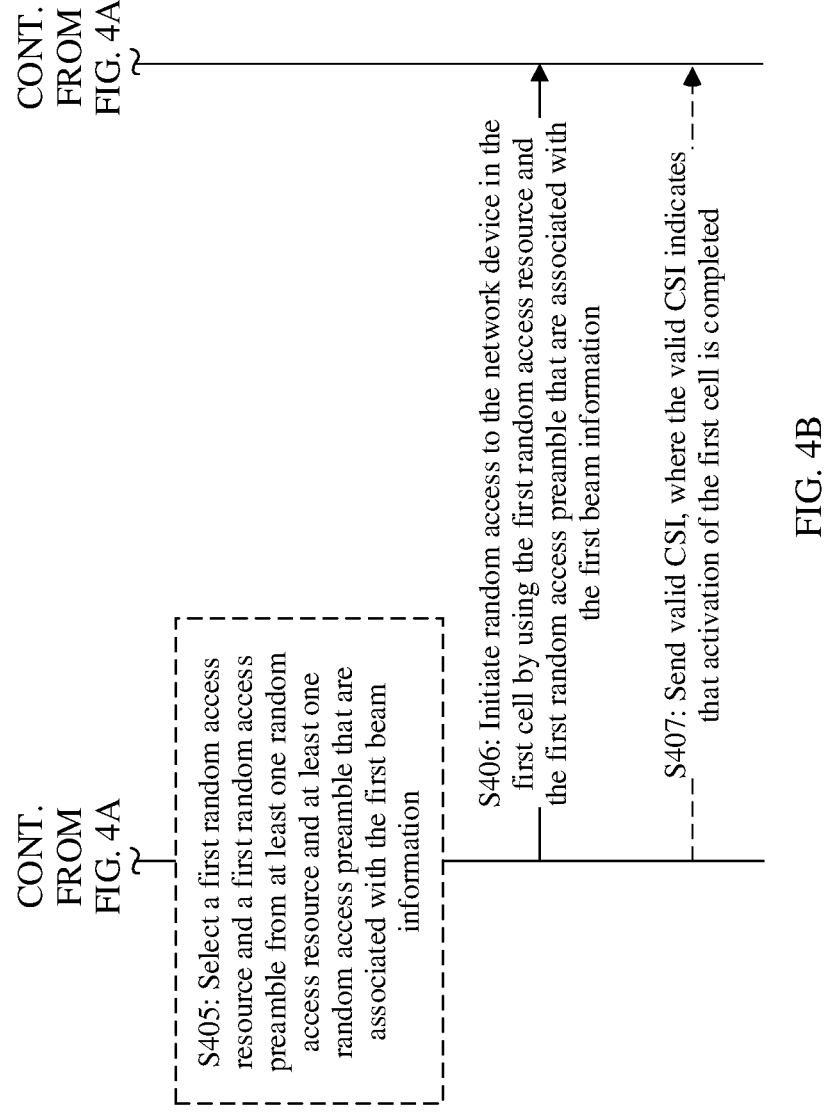

CONT.
FROM
FIG. 4A

CONT.
FROM
FIG. 4A

S405: Select a first random access resource and a first random access preamble from at least one random access resource and at least one random access preamble that are associated with the first beam information S406: Initiate random access to the network device in the first cell by using the first random access resource and the first random access preamble that are associated with the first beam information S407: Send valid CSI, where the valid CSI indicates that activation of the first cell is completed

FIG. 4B

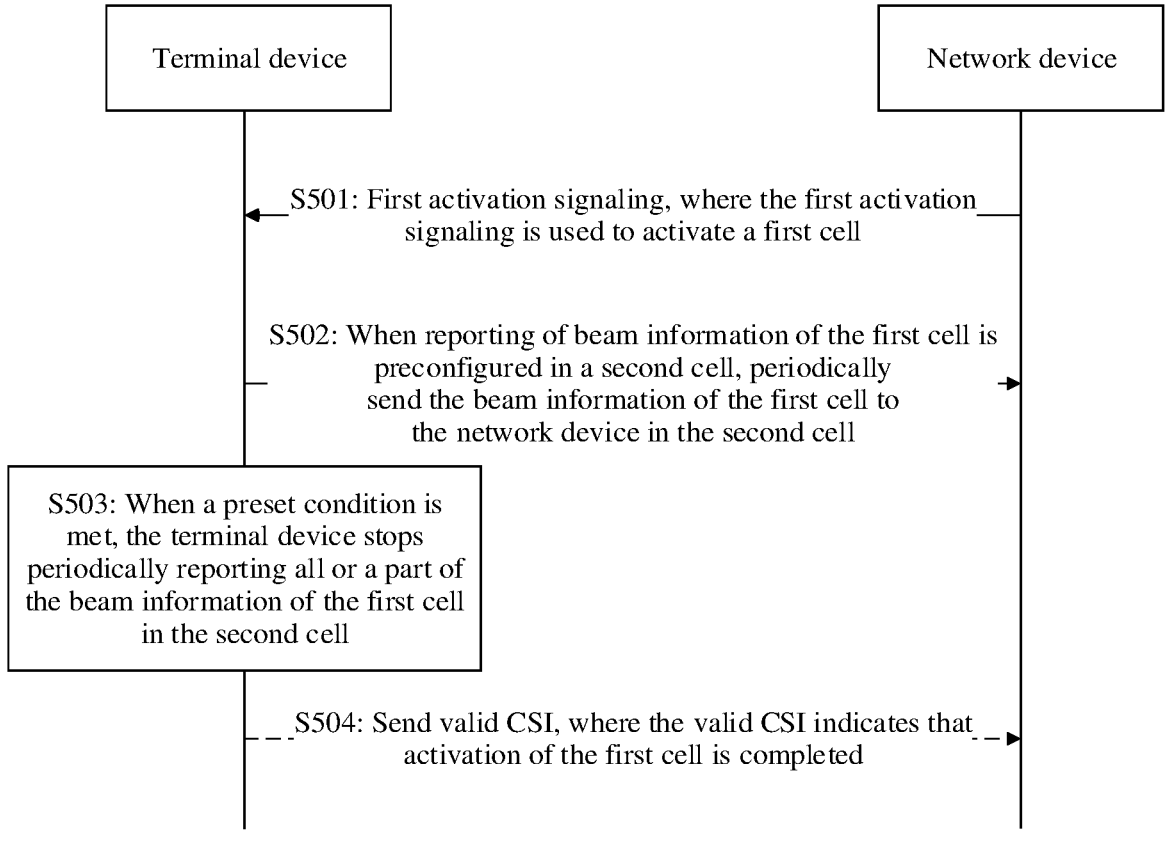

| Terminal device | | Network device |
| --- | --- | --- |

S501: First activation signaling, where the first activation signaling is used to activate a first cell S502: When reporting of beam information of the first cell is preconfigured in a second cell, periodically send the beam information of the first cell to the network device in the second cell S503: When a preset condition is met, the terminal device stops periodically reporting all or a part of the beam information of the first cell in the second cell S504: Send valid CSI, where the valid CSI indicates that activation of the first cell is completed

FIG. 5

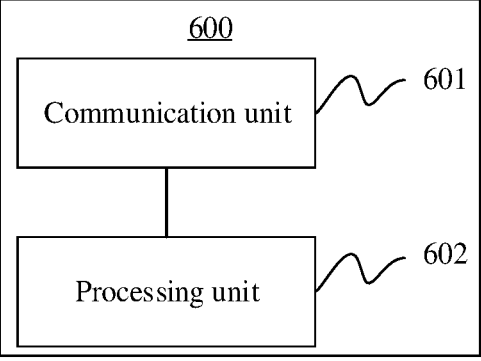

600

Communication unit    601

Processing unit    602

FIG. 6

BEAM INFORMATION REPORTING AND RECEIVING METHOD AND APPARATUS

CROSS-REFERENCE TO RELATED APPLICATIONS

This application is a continuation of International Application No. PCT/CN2021/071667, filed on Jan. 14, 2021, the disclosure of which is hereby incorporated by reference in its entirety.

TECHNICAL FIELD

This application relates to the field of communication technologies, and in particular, to a beam information reporting and receiving method and apparatus.

BACKGROUND

In an existing communication system, a network device may improve a system capacity by configuring carrier aggregation (CA). The CA is a technology that aggregates a plurality of component carriers (CCs) to support a larger transmission bandwidth. The plurality of CCs aggregated in the CA include a primary component carrier (PCC) and a secondary component carrier (SCC). A cell corresponding to the PCC is referred to as a primary cell (PCell), and a cell corresponding to the SCC is referred to as a secondary cell (SCell). Secondary cells include a secondary cell that has a capability of sending a physical uplink control channel (PUCCH), which may be referred to as a PUCCH secondary cell for short, and/or a common secondary cell that does not have the capability of sending the PUCCH. How a terminal device reports beam information of the PUCCH secondary cell to the network device in an activation process of the PUCCH secondary cell is a technical problem to be resolved in embodiments of this application.

SUMMARY

This application provides a beam information reporting and receiving method and apparatus, to implement beam information reporting of a first cell.

According to a first aspect, a beam information reporting method is provided, including: A terminal device receives first activation signaling from a network device, where the first activation signaling is used to activate a first cell, and the first cell is a secondary cell that has a capability of sending a physical uplink control channel PUCCH. The terminal device measures a reference signal of the first cell to determine beam information of the first cell. The terminal device sends layer 2 signaling to the network device by using a second cell, where the layer 2 signaling includes the beam information of the first cell, and the second cell is a primary cell or a primary secondary cell corresponding to the first cell.

According to the foregoing method, in an activation process of the first cell, the terminal device may report the beam information of the first cell by using the second cell, so that the network device can obtain the beam information of the first cell, thereby implementing activation of the first cell.

In a possible implementation, the layer 2 signaling includes media access control control element MAC CE signaling.

In a possible implementation, the method further includes: determining, by the terminal device in response to the first activation signaling, whether the first cell is an unknown cell; and if the first cell is the unknown cell, performing the step in which the terminal device measures a reference signal of the first cell to determine beam information of the first cell.

For a known cell, the beam information of the first cell has been reported, and no further reporting is required. A beam information of the first cell needs to be reported only for an unknown cell. In this embodiment of this application, before the reference signal of the first cell is measured to determine the beam information of the first cell, whether the first cell is the unknown cell is first determined. In this way, reference signal measurement and beam reporting procedures are avoided for the known cell, thereby reducing power consumption and signaling overheads of the terminal device.

Optionally, after the terminal device sends the layer 2 signaling to the network device by using the second cell, the method further includes: The terminal device sends valid channel state information CSI to the network device, where the valid CSI indicates that activation of the first cell is completed.

According to the foregoing method, a procedure of the entire solution may be as follows: The network device sends the activation signaling of the first cell to the terminal device. The terminal device reports, in response to the activation signaling, the beam information of the first cell by using the second cell. The network device may configure a TCI, an uplink spatial relation, and/or the like for the terminal device based on the reported beam information of the first cell. The TCI indicates a beam used by the terminal device to receive downlink information, and the uplink spatial relation indicates a beam used by the terminal device to send uplink information. The terminal device sends the valid CSI to the network device to indicate that activation of the first cell is completed. It can be learned from the foregoing descriptions that, in this embodiment of this application, the beam information of the first cell may be reported by using the second cell in the activation process of the first cell.

In a possible implementation, a process in which the terminal device measures a reference signal of the first cell to determine beam information of the first cell includes: The terminal device measures the reference signal of the first cell to obtain a measurement result of the reference signal. The terminal device selects, from the reference signal of the first cell, a reference signal whose measurement result meets a condition. The beam information of the first cell includes indication information of the reference signal whose measurement result meets the condition, and/or layer 1 reference signal received power L1-RSRP of the reference signal whose measurement result meets the condition.

A process in which the terminal device measures a reference signal of the first cell includes: If a CSI measurement configuration is preconfigured in the first cell, the terminal device measures the reference signal included in the CSI measurement configuration preconfigured in the first cell; or if a first reference signal list is preconfigured in the first cell, the terminal device measures the reference signal included in the first reference signal list preconfigured in the first cell.

According to a second aspect, a beam information receiving method is provided, including: A network device sends first activation signaling to a terminal device, where the first activation signaling is used to activate a first cell, and the first cell is a secondary cell that has a capability of sending a PUCCH. The network device receives layer 2 signaling from the terminal device by using a second cell, where the layer 2 signaling includes beam information of the first cell, and the second cell is a primary cell or a primary secondary cell of the first cell.

According to the foregoing method, in an activation process of the first cell, the network device may receive the beam information of the first cell by using the second cell, thereby implementing activation of the first cell.

In a possible implementation, the layer 2 signaling includes MAC CE signaling, and/or the first cell is an unknown cell.

In a possible solution, after the network device receives the layer 2 signaling from the terminal device by using the second cell, the method may further include: The network device receives valid CSI from the terminal device, where the valid CSI indicates that activation of the first cell is completed.

Optionally, the beam information that is of the first cell and that is received by the network device by using the second cell may include indication information of a reference signal whose measurement result meets a condition, and/or L1-RSRP of the reference signal whose measurement result meets the condition.

According to a third aspect, a beam information reporting method is provided, including: A terminal device receives first activation signaling from a network device, where the first activation signaling is used to activate a first cell, and the first cell is a secondary cell that has a capability of sending a PUCCH. The terminal device measures a reference signal of the first cell to determine first beam information. The terminal device initiates random access to the network device in the first cell by using a first random access resource and a first random access preamble that are associated with the first beam information.

According to the foregoing method, the terminal device implicitly reports the beam information of the first cell to the network device by using the random access resource and the random access preamble that are associated with the beam information, thereby reducing signaling overheads.

In a possible implementation, the first beam information may be associated with at least one random access resource and at least one random access preamble. The terminal device may select the first random access resource from the at least one random access resource associated with the first beam information, and select the first random access preamble from the at least one random access preamble. It may be understood that the foregoing process is optional. If the first beam information is associated with only one random access preamble and one random access resource, the terminal device does not need to perform the foregoing selection process. One random access resource associated with the first beam information is the first random access resource, and one random access preamble associated with the terminal device is the first random access preamble.

In a possible implementation, the method further includes: determining, by the terminal device in response to the first activation signaling, whether the first cell is an unknown cell; and if the first cell is the unknown cell, performing a step in which the terminal device measures a reference signal of the first cell to determine first beam information.

Optionally, after the terminal device initiates random access to the network device in the first cell by using the first random access resource and the first random access preamble that are associated with the first beam information, the method further includes: The terminal device sends valid CSI to the network device, where the valid CSI indicates that activation of the first cell is completed.

According to the foregoing method, the entire solution at least includes: The network device sends the activation signaling of the first cell to the terminal device. The terminal device determines, in response to the activation signaling of the first cell, the first beam information of the first cell. The terminal device determines the first random access resource and the first random access preamble that correspond to first beam information. The terminal device initiates random access based on the first random access resource and the first random access preamble, so that the terminal device can implicitly report the beam information of the first cell in a random access process, and does not need to additionally report the beam information of the first cell, thereby reducing signaling overheads for reporting the beam information of the first cell.

In a possible implementation, that the terminal device measures a reference signal of the first cell to determine first beam information includes: The terminal device measures the reference signal of the first cell to obtain a measurement result of the reference signal. The terminal device selects, from the reference signal of the first cell, a reference signal whose measurement result meets a condition. The first beam information includes indication information of the reference signal whose measurement result meets the condition, and/or L1-RSRP of the reference signal whose measurement result meets the condition.

Optionally, before the terminal device initiates random access based on the beam information of the first cell, the method further includes: determining, by the terminal device, whether a timing advance TAG timing advance TA of the first cell is invalid; and if the TAG TA of the first cell is invalid, performing a step in which the terminal device initiates random access to the network device in the first cell by using a first random access resource and a first random access preamble that are associated with the first beam information. If the TAG TA of the first cell is valid, the beam information of the first cell may be reported in another manner. For example, the beam information of the first cell is reported by using the method in the first aspect.

In this embodiment of this application, the TAG TA of the first cell may be considered as valid in the following condition: If a time alignment timer associated with a TAG of the first cell is running, the TA of the first cell is considered as valid. Otherwise, the TA of the first cell is considered as invalid. Optionally, TA invalidness may also be referred to as TA expiration or the like. In a wireless communication process, if a TA on a terminal device side is invalid, it usually means that the terminal device and the network device cannot strictly maintain time synchronization. In this case, the terminal device needs to re-initiate random access, and the network device allocates a valid TA to the terminal device in a random access process of the terminal device. According to an existing protocol, random access to a secondary cell can be triggered only by a PDCCH order. A random access process of the secondary cell may be as follows: The terminal device reports beam information to the network device; the network device selects a beam from the beam information reported by the terminal device, and sends a PDCCH order to the terminal device in the beam; and the terminal device initiates random access through triggering of the foregoing PDCCH order to obtain a valid TA. However, in the foregoing solution, when determining that the TA of the first cell is invalid, the terminal device directly initiates random access based on the first random access resource and the first random access preamble that are associated with the beam information of the first cell, in other words, implicitly reports the beam information of the first cell to the network device. Alternatively, the valid TA allocated by the network device to the terminal device may be obtained in the random access process. Compared with a process in which the beam information of the secondary cell is reported and then the PDCCH order is sent by the network device to trigger random access of the terminal device, which is specified in a current protocol, a process in which the terminal device obtains the valid TA is simplified, thereby reducing signaling overheads.

According to a fourth aspect, a beam information receiving method is provided, including: A network device sends first activation signaling to a terminal device, where the first activation signaling is used to activate a first cell, and the first cell is a secondary cell that has a capability of sending a PUCCH. The network device receives a first random access preamble from the terminal device in the first cell by using a first random access resource, where first beam information associated with the first random access resource and the first random access preamble is beam information of the first cell. Optionally, the first cell may be an unknown cell, and/or a TAG TA of the first cell is invalid.

The first beam information may include indication information of a reference signal whose measurement result meets a condition, and/or L1-RSRP of the reference signal whose measurement result meets the condition.

In a possible implementation, the first beam information is associated with at least one random access resource and at least one random access preamble, the at least one random access resource includes the first random access resource, and the at least one random access preamble includes the first random access preamble.

Optionally, after the network device receives the first random access preamble from the terminal device in the first cell by using the first random access resource, the method further includes: The network device receives valid CSI from the terminal device, where the valid CSI indicates that activation of the first cell is completed.

According to a fifth aspect, a beam information reporting method is provided, including: A terminal device receives first activation signaling from a network device, where the first activation signaling is used to activate a first cell, and the first cell is a secondary cell that has a capability of sending a PUCCH. When reporting of beam information of the first cell is preconfigured in a second cell, the terminal device periodically sends the beam information of the first cell to the network device in the second cell, where the second cell is a primary cell or a primary secondary cell of the first cell. When a preset condition is met, the terminal device stops periodically reporting all or a part of the beam information of the first cell in the second cell. Optionally, the first cell is an unknown cell or a known cell.

According to the foregoing method, when the preset condition is met, the terminal device directly stops periodically reporting the beam information of the first cell in the second cell. Compared with a current solution, because reporting of a beam of a first cell is configured in a second cell, even when the first cell is successfully activated, the second cell still reports the beam information of the first cell, unless reporting that is of the beam information of the first cell and that is configured in the second cell is deleted through an RRC signaling reconfiguration. In this embodiment of this application, reporting of the beam information of the first cell in the second cell may be stopped without an RRC signaling reconfiguration, thereby reducing signaling overheads.

In a possible implementation, the preset condition includes at least one of the following: The terminal device receives a transmission configuration indicator TCI and/or an uplink spatial relation indication from the network device; the terminal device sends first piece of valid CSI of the first cell in the second cell; the terminal device sends the valid CSI to the network device, where the valid CSI indicates that activation of the first cell is completed; and the terminal device receives a physical downlink control channel PDCCH order or valid TA information from the network device, where the PDCCH order is used to trigger random access of the terminal device, the PDCCH order includes the beam information of the first cell, and the valid TA information is allocated by the network device to the terminal device in a random access process of the terminal device. In this embodiment of this application, when one or more of the foregoing preset conditions are met, the terminal device may stop reporting the beam information of the first cell in the second cell.

In a possible implementation, the foregoing method may further include: The terminal device sends the valid CSI to the network device, where the valid CSI indicates that activation of the first cell is completed.

According to a sixth aspect, a beam information receiving method is provided, including: A network device sends first activation signaling to a terminal device, where the first activation signaling is used to activate a first cell, and the first cell is a secondary cell that has a capability of sending a PUCCH. When reporting of beam information of the first cell is preconfigured in a second cell, the network device receives the beam information of the first cell from the terminal device in the second cell, where the second cell is a primary cell or a primary secondary cell of the first cell. Optionally, the first cell is an unknown cell or a known cell.

According to the foregoing method, the network device can receive the beam information of the first cell by using the second cell, to receive the beam information of the first cell in an activation process of the first cell, so that the network device can subsequently successfully activate the first cell for the terminal device.

In a possible implementation, the method further includes: The network device receives valid CSI from the terminal device, where the valid CSI indicates that activation of the first cell is completed.

In a possible implementation solution, when sending the first activation signaling, the network device may further need to determine whether the first cell is the unknown cell. If the first cell is the unknown cell, the network device may configure a TCI, an uplink spatial relation, and/or the like for the first cell based on the beam information of the first cell.

According to a seventh aspect, an apparatus is provided, including units for implementing any one of the first aspect, the third aspect, or the fifth aspect.

According to an eighth aspect, an apparatus is provided, including units for implementing any one of the second aspect, the fourth aspect, or the sixth aspect.

According to a ninth aspect, an apparatus is provided, including a processor and an interface circuit. The interface circuit is configured to: receive a signal from another communication apparatus other than the communication apparatus and transmit the signal to the processor, or send a signal from the processor to another communication apparatus other than the communication apparatus. The processor is configured to implement the method in the implementations of the first aspect, the third aspect, or the fifth aspect by using a logic circuit or by executing code instructions.

According to a tenth aspect, an apparatus is provided, including a processor and an interface circuit. The interface circuit is configured to: receive a signal from another communication apparatus other than the communication apparatus and transmit the signal to the processor, or send a signal from the processor to another communication apparatus other than the communication apparatus. The processor is configured to implement the method in the implementations of the second aspect, the fourth aspect, or the sixth aspect by using a logic circuit or by executing code instructions.

According to an eleventh aspect, a system is provided, including the apparatus in the seventh aspect or the ninth aspect and the apparatus in the eighth aspect or the tenth aspect.

According to a twelfth aspect, a computer-readable storage medium is provided. The computer-readable storage medium stores a computer program or instructions. When the computer program or the instructions are executed, the method in the implementations of any one of the first aspect to the sixth aspect is implemented.

According to a thirteenth aspect, a computer program product including instructions is provided. When the instructions are run, the method in the implementations of any one of the first aspect to the sixth aspect is implemented.

According to a fourteenth aspect, a circuit system is provided. The circuit system includes a processor, and may further include a memory. The circuit system is configured to implement the method described in any one of the first aspect to the sixth aspect. The circuit system may include a chip, or may include a chip and another discrete component.

BRIEF DESCRIPTION OF THE DRAWINGS

FIG. 4A and FIG. 4B are a flowchart of a beam reporting and receiving method according to Embodiment 2 of this application;

FIG. 5 is a flowchart of a beam reporting and receiving method according to Embodiment 3 of this application;

FIG. 6 is a schematic diagram of a structure of an apparatus according to an embodiment of this application.

DETAILED DESCRIPTION OF ILLUSTRATIVE EMBODIMENTS

Figure 1:
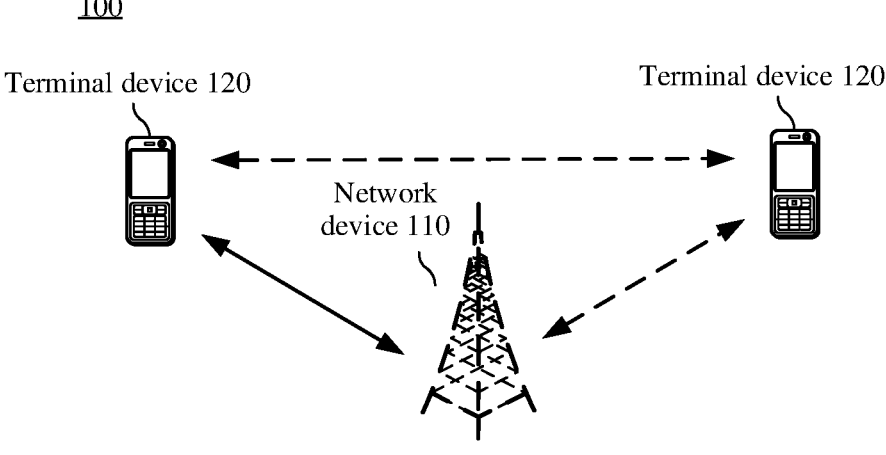
FIG. 1 is a schematic diagram of a network architecture according to an embodiment of this application.

FIG. 1 is an example diagram of a network architecture 100 to which an embodiment of this application can be applied. The network architecture 100 may include at least one network device 110. The network device 110 may be a device that communicates with a terminal device, for example, a base station or a base station controller. Each network device 110 may provide communication coverage for a specific geographical area, and may communicate with a terminal device located in the coverage area (cell). The network device 110 may be an access network device. The access network device may also be referred to as a radio access network (radio access network, RAN) device, and is a device that provides a wireless communication function for the terminal device. For example, the access network device includes but is not limited to: a next-generation NodeB (generation NodeB, gNB) in 5G, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmission reception point (TRP), a transmission point (TP), a mobile switching center, and/or the like. Alternatively, the access network device may be a radio controller, a central unit (CU), and/or a distributed unit (DU) in a cloud radio access network (CRAN) scenario. Alternatively, the network device may be a relay station, an access point, a vehicle-mounted device, a wearable device, a network device in the future 5G network, a network device in a future evolved public land mobile network (PLMN), or the like.

In embodiments of this application, an apparatus configured to implement functions of the network device may be a network device, or may be an apparatus, for example, a circuit system, that can support the network device in implementing the functions. The apparatus may be installed in the network device. In the technical solutions provided in embodiments of this application, the technical solutions provided in embodiments of this application are described by using an example in which the apparatus configured to implement the functions of the network device is the network device.

The network architecture 100 further includes one or more terminal devices 120 located within a coverage area of the network device 110. The terminal device 120 may be mobile or fixed. The terminal device 120 may be referred to as a terminal for short, and is a device with a wireless transceiver function. The terminal device may be deployed on land, where the deployment includes indoor or outdoor, or handheld or vehicle-mounted deployment, may be deployed on water (for example, on a ship), or may be deployed in air (for example, on aircraft, a balloon, or a satellite). The terminal device may be a mobile phone, a pad, a computer with a wireless transceiver function, a virtual reality (VR) terminal device, an augmented reality (AR) terminal device, a wireless terminal device in industrial control, a wireless terminal device in self-driving, a wireless terminal device in telemedicine, a wireless terminal device in a smart grid, a wireless terminal device in transportation safety, a wireless terminal device in a smart city, and/or a wireless terminal device in a smart home. Alternatively, the terminal device may be a cellular phone, a cordless phone, a session initiation protocol (SIP) phone, a wireless local loop (WLL) station, a personal digital assistant (PDA), a handheld device or a computing device with a wireless communication function, a vehicle-mounted device, a wearable device, a terminal device in the future 5th generation (the 5G) network, a terminal device in the future evolved public land mobile network (PLMN), or the like. Sometimes, the terminal device may also be referred to as user equipment (UE). The terminal device 120 may communicate with a plurality of access network devices of different technologies. For example, the terminal device may communicate with an access network device that supports long term evolution (long term evolution, LTE), may communicate with an access network device that supports 5G, and may further be dual-connected to an access network device that supports LTE and an access network device that supports 5G. This is not limited in embodiments of this application.

In embodiments of this application, an apparatus configured to implement functions of the terminal device may be a terminal device, or may be an apparatus, for example, a circuit system, that can support the terminal device in implementing the functions. The apparatus may be installed in the terminal device. In embodiments of this application, the circuit system may include a chip, or may include a chip and another discrete component. The technical solutions provided in embodiments of this application are described by using an example in which the apparatus configured to implement the functions of the terminal device is the terminal device.

The network device 110 and the terminal device 120 may perform data transmission by using an air interface resource. The air interface resource may include at least one of a time-domain resource, a frequency-domain resource, a code-domain resource, and a spatial resource. Specifically, when the network device 110 and the terminal device 120 perform data transmission, the network device 110 may send control information to the terminal device 120 through a control channel such as a physical downlink control channel (PDCCH), to allocate a transmission parameter of a data channel to the terminal device 120. For example, a resource of a physical downlink shared channel (physical downlink shared channel, PDSCH) or a physical uplink shared channel (PUSCH) is allocated. For example, the control information may indicate a time domain symbol and/or a frequency-domain resource block (RB) to which the data channel is mapped. The network device 110 and the terminal device 120 perform data transmission on the allocated time-frequency resource through the data channel. The foregoing data transmission may include downlink data transmission and/or uplink data transmission. Downlink data (for example, data carried on the PDSCH) transmission may mean that the network device 110 sends data to the terminal device 120, and uplink data (for example, data carried on the PUSCH) transmission may mean that the terminal device 120 sends data to the network device 110. The data may be data in a broad sense, for example, may be user data, system information, broadcast information, or other information.

FIG. 1 illustrates one network device and two terminal devices. Optionally, the network architecture 100 may include a plurality of network devices, and a coverage area of one network device may include another quantity of terminal devices. This is not limited in this embodiment of this application.

It may be understood that the network architecture and a service scenario described above are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems. For example, the technical solutions provided in embodiments of this application may be applied to a fourth generation (4G) network architecture such as a long term evolution (long term evolution, LTE) system, a fifth generation (5G) network architecture such as a new radio (new radio, NR) system, or various future evolved network architectures such as the internet of things, the internet of vehicles, and a sixth generation (6G) network architecture. This is not limited.

In the network architecture shown in FIG. 1, a concept of a physical uplink control channel (PUCCH) secondary cell is proposed. The PUCCH secondary cell is a cell that has a capability of sending the PUCCH, and therefore the PUCCH secondary cell is different from a common secondary cell. The common secondary cell does not have the capability of sending the PUCCH, and the common secondary cell can send the PUCCH only by using a corresponding primary cell, primary secondary cell, or PUCCH secondary cell. For the PUCCH secondary cell, the following activation process is proposed:

The network device sends media access control (MAC) activation signaling to the terminal device. When receiving the MAC activation signaling, the terminal device measures a reference signal (RS) preconfigured for a to-be-activated PUCCH secondary cell to obtain beam information, and reports the beam information to the network device. The network device configures a transmission configuration indicator (TCI), an uplink spatial relation, and the like for the terminal device based on the beam information reported by the terminal device. The terminal device sends a valid channel state information (CSI) report to the network device on a PUCCH of the to-be-activated PUCCH secondary cell based on indication of the TCI, to indicate that activation of the PUCCH secondary cell is completed. Optionally, the foregoing activation process is merely an example for description, and is not intended as a limitation on this embodiment of this application. For example, the foregoing activation process may further include processes such as cell search, automatic gain control (AGC), and timing. How the terminal device reports the beam information of the PUCCH secondary cell to the network device in an activation process of the PUCCH secondary cell is a technical problem to be resolved in embodiments of this application.

For the foregoing problem, an embodiment of this application provides a plurality of solutions. A first solution may be specifically as follows: The terminal device sends layer 2 signaling on a primary cell or a primary secondary cell corresponding to the PUCCH secondary cell, where the layer 2 signaling includes the beam information of the PUCCH secondary cell. For details, refer to following descriptions in Embodiment 1. A second solution may be specifically as follows: The terminal device implicitly reports the beam information of the PUCCH secondary cell to the network device by using a random access resource and a random access preamble that are associated with the beam information of the PUCCH secondary cell. For details, refer to following descriptions in Embodiment 2. A third solution may be specifically as follows: When reporting of the beam information of the PUCCH secondary cell is configured in a primary cell or a primary secondary cell, the terminal device may periodically report the beam information of the PUCCH secondary cell in the primary cell or the primary secondary cell; and when a preset condition is met, the terminal device may stop periodically reporting the beam information of the PUCCH secondary cell in the primary cell or the primary secondary cell. For details, refer to following descriptions in Embodiment 3.

For ease of understanding, the following explains and describes communication terms or terms in this application.

1. Primary Cell (PCell)

The primary cell may be a cell in which the terminal device performs initial connection establishment, a cell in which the terminal device performs radio resource control (radio resource control, RRC) connection reestablishment, a primary cell specified in a handover (handover) process, or the like. The primary cell is mainly used to perform RRC communication with the terminal device. A component carrier corresponding to the primary cell is referred to as a primary component carrier (PCC).

2. Primary Secondary Cell (PSCell)

The primary secondary cell is a concept proposed in dual connectivity (DC). For ease of understanding, the dual connectivity is introduced first. Because a bandwidth resource and a coverage area of a single base station are limited, a dual connectivity technology is introduced in LTE and NR to provide a performance solution between base stations in a non-ideal transmission condition. In a dual connectivity solution, after being segmented and combined at a packet data convergence protocol (PDCP) layer, a user data stream is simultaneously transmitted to the terminal device by using a plurality of different base stations, thereby obtaining a large bandwidth and a high rate. In another dual connectivity solution, a user data stream may be segmented or combined at another location, for example, a core network side, and then a processed user data stream is simultaneously transmitted to the terminal device by using a plurality of different base stations. One of the plurality of base stations is a master node (MN), and a remaining base station is a secondary node (SN). The MN and the SN may use a same radio access technology or different radio access technologies. This is not limited. For example, the MN may use an LTE standard, and the SN may use an NR standard.

Figure 2:
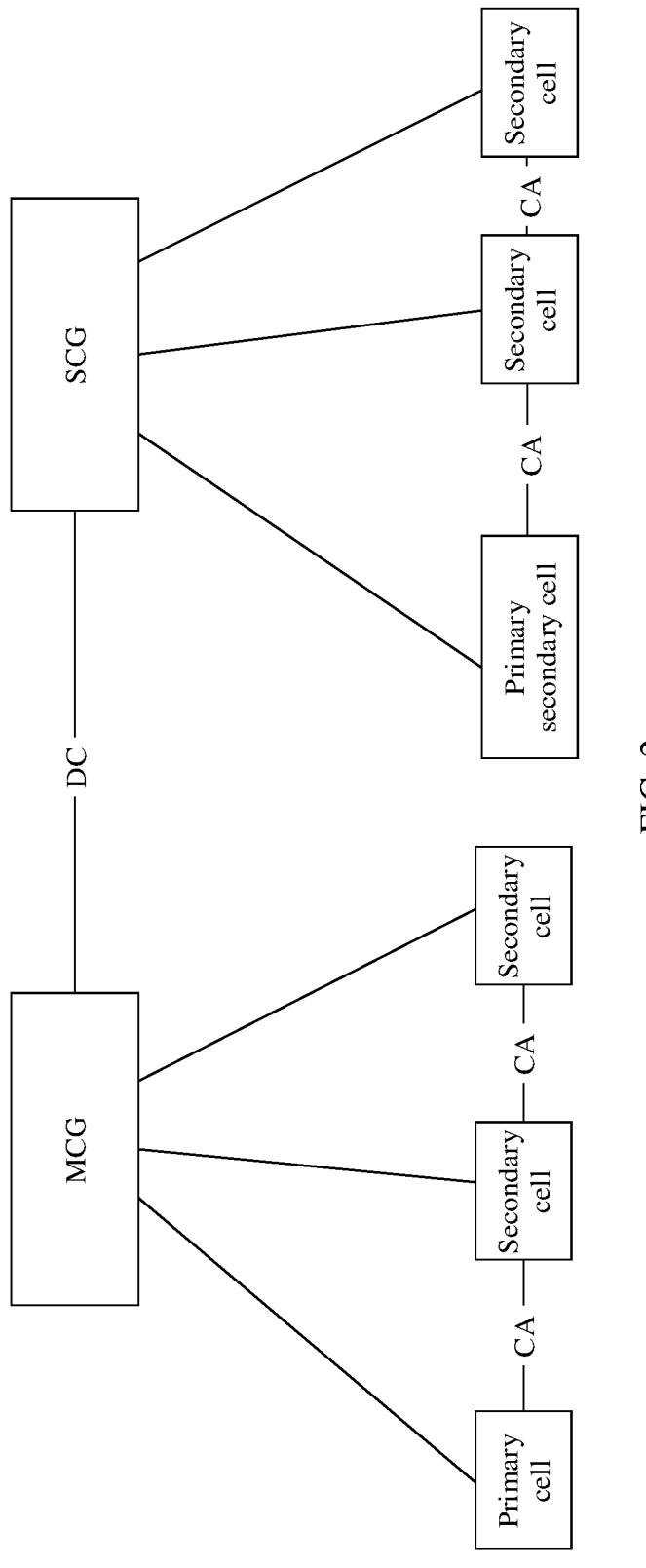
FIG. 2 is a schematic diagram of a master cell group MCG and a secondary cell group SCG in dual connectivity DC according to an embodiment of this application.

As shown in FIG. 2, concepts of a master cell group (MCG) and a secondary cell group (SCG) exist in dual connectivity. In a possible explanation, a group of cells to which the terminal device first initiates random access may be considered as the MCG. If there is no DC, there is no MCG or SCG. Alternatively, it may be considered that if there is no DC, the cell group accessed by the terminal device is the master cell group.

Still refer to FIG. 2. There may be a plurality of cells in the MCG, and a cell that is used by the terminal device to initiate random access and that is in the plurality of cells is referred to as a primary cell. Other cells than the primary cell in the MCG are referred to as secondary cells. The primary cell and the secondary cell in the MCG may be combined by using a carrier aggregation technology. Similar to the MCG, a cell used by the terminal device to initiate random access in the SCG is referred to as a primary secondary cell. Other cells in the SCG than the primary secondary cell are referred to as secondary cells, and the primary secondary cell and the foregoing other secondary cells are combined by using the carrier aggregation technology.

3. Carrier Aggregation (CA)

Carrier aggregation is a technology that aggregates a plurality of component carriers (CCs) to support a larger transmission bandwidth. To efficiently utilize fragmented spectrums, the carrier aggregation supports aggregation of different component carriers, for example, aggregation of component carriers in a same bandwidth or different bandwidths, aggregation of adjacent or non-adjacent component carriers in a same bandwidth, or aggregation of component carriers in different bandwidths. For example, in FIG. 2, a component carrier corresponding to the primary cell may be a primary component carrier (PCC), and a component carrier corresponding to the secondary cell may be a secondary component carrier (SCC).

4. Secondary Cell (SCell)

The secondary cell may be a cell that does not perform RRC communication with the terminal device, and is mainly used to provide an additional radio resource. The secondary cell may be added when RRC is reconfigured. In an example, the primary cell may be determined when a connection is established, and the secondary cell may be added, modified, or released by using an RRC connection reconfiguration message after initial access is completed.

5. Beam

The beam may be embodied as a spatial domain filter in a protocol, or referred to as a spatial filter, a spatial parameter, or the like. A beam used to send a signal may be referred to as a transmission beam (Tx beam), a spatial domain transmission filter, a spatial transmission parameter, or the like. A beam used to receive a signal may be referred to as a reception beam (Rx beam), a spatial domain receive filter, a spatial reception parameter, or the like. The transmission beam may refer to distribution of signal strength formed in different directions in space after a signal is transmitted through an antenna, and the reception beam may refer to distribution of signal strength in different directions in space of a radio signal received from an antenna.

In addition, in the descriptions of this application, "/" represents an "or" relationship between associated objects unless otherwise specified. For example, A/B may represent A or B. The term "and/or" in this application describes only an association relationship between associated objects and represents that three relationships may exist. For example, A and/or B may represent the following three cases: Only A exists, both A and B exist, and only B exists, where A and B may be singular or plural. In addition, in the descriptions of this application, unless otherwise specified, "a plurality of" means two or more than two. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

Embodiment 1

Embodiment 1 provides a beam information reporting and receiving method. The method may be used to report beam information in an activation process of a PUCCH secondary cell. The method includes: A terminal device receives first activation signaling from a network device, where the first activation signaling is used to activate a first cell, and the first cell is a secondary cell that has a capability of sending a PUCCH. The terminal device measures a reference signal of the first cell to determine beam information of the first cell. The terminal device sends layer 2 signaling to the network device by using a second cell, where the layer 2 signaling includes the beam information of the first cell, and the second cell is a primary cell or a primary secondary cell corresponding to the first cell.

Figure 3:
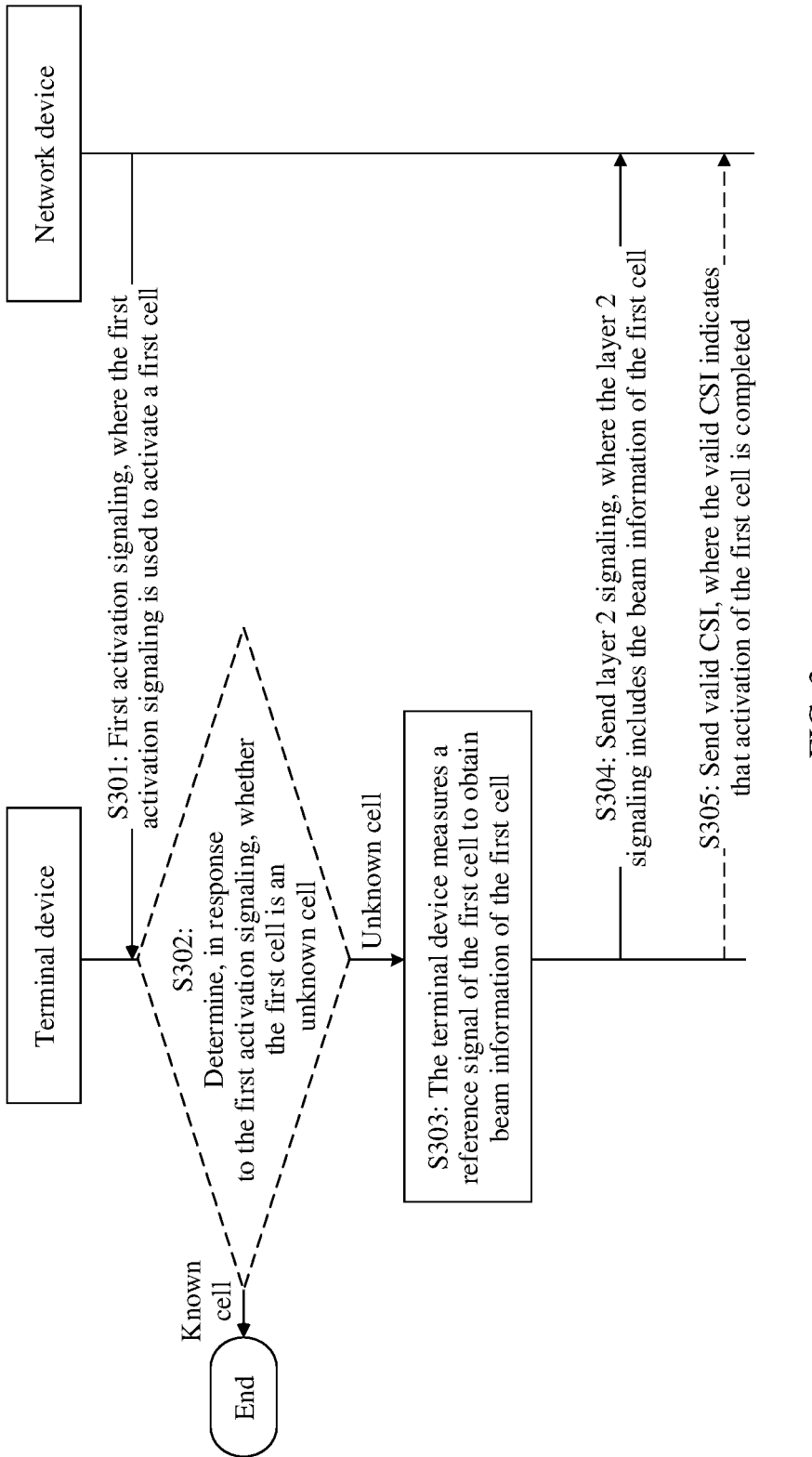
FIG. 3 is a flowchart of a beam reporting and receiving method according to Embodiment 1 of this application.

As shown in FIG. 3, a procedure of the beam information reporting and receiving method is provided, and the procedure includes at least the following steps.

Step S301: A network device sends first activation signaling to a terminal device, where the first activation signaling is used to activate a first cell, and the first cell is a secondary cell that has a capability of sending a PUCCH. Optionally, the first activation signaling may be MAC activation signaling or the like.

Step S302: The terminal device determines, in response to the first activation signaling, whether the first cell is an unknown cell. If the first cell is the unknown cell, step 303 is performed. If the first cell is a known cell, it indicates that the terminal device has reported beam information of the first cell to the network device, and the terminal device does not need to report the beam information of the first cell to the network device by using the following procedure in step 303 and step 304. This application focuses on how to report beam information to the network device in an activation process of an unknown cell. An activation process of a known cell is not limited, and is not described in detail. For ease of description, FIG. 3 is represented by "end the procedure". The foregoing step 302 is optional.

In an example, if the first cell is a cell in a frequency range 1 (frequency range 1, FR1), the terminal device considers that the first cell is the known cell when the first cell meets the following condition. Otherwise, the terminal device considers that the first cell is the unknown cell.

1: The terminal device reports a valid measurement result of the first cell in a time period before the activation signaling is received.

2: In an activation process of the terminal device and in a time period before the activation process, a reference signal of the first cell measured by the terminal device always meets a detectable condition. The detectable condition may include at least one of the following: a signal-to-interference-plus-noise ratio (signal-to-interference-plus-noise ratio, SINR) of the reference signal of the first cell is greater than or equal to a first preset value, an interference power spectral density of the reference signal of the first cell is greater than or equal to a second preset value, or reference signal received power of the first cell is greater than or equal to a third preset value.

In another example, if the first cell is a cell in a frequency range 2 (frequency range 2, FR2), the terminal device considers that the first cell is the known cell when the first cell meets the following condition. Otherwise, the terminal device considers that the first cell is the unknown cell.

1: In a time period before the terminal device receives a latest TCI activation command and a latest semi-persistent channel state information reference signal (CSI-RS) activation command, the terminal device has reported valid layer 3 reference signal received power (L3-RSRP) measurement of the reference signal.

2: The terminal device receives the activation signaling of the first cell after the L3-RSRP is reported, and the activation signaling is not later than a TCI received by the terminal device.

3: The reference signal reported by the terminal device always remains detectable during a period from L3-RSRP reporting to channel quality indication (CQI) reporting. For the detectable condition, refer to the foregoing descriptions, and details are not described again. In addition, the TCI is configured based on one or more reference signals recently reported by the terminal device.

Step S303: The terminal device measures the reference signal of the first cell to obtain the beam information of the first cell.

In an example, the terminal device may measure the reference signal of the first cell to obtain a measurement result of the reference signal. The terminal device selects a reference signal whose measurement result meets a condition from the reference signal of the first cell. The beam information of the first cell includes indication information of the reference signal whose measurement result meets the condition, and/or layer 1 reference signal received power (layer 1 reference signal received power, L1-RSRP) of the reference signal whose measurement result meets the condition.

For example, a process in which the terminal device measures the reference signal of the first cell may be as follows: If a CSI measurement configuration is preconfigured in the first cell, the terminal device may measure the reference signal included in the CSI measurement configuration preconfigured in the first cell; or if a first reference signal list is preconfigured in the first cell, the terminal device may measure the reference signal included in the first reference signal list preconfigured in the first cell.

Step S304: The terminal device sends layer 2 signaling to the network device by using a second cell, where the layer 2 signaling includes the beam information of the first cell, and the second cell is a primary cell or a primary secondary cell corresponding to the first cell. Optionally, the layer 2 signaling may be a media access control control element (MAC CE) or the like. For example, in a communication protocol between the terminal device and the network device, a first layer may be a physical (PHY) layer, a second layer may be a MAC layer, a third layer may be a radio link control (RLC) layer, a fourth layer may be a PDCP layer, and a fifth layer may be an RRC layer. The layer 2 signaling may refer to signaling sent at the MAC layer. Certainly, the foregoing protocol stack is merely an example for description, and is not intended as a limitation on this embodiment of this application.

In this embodiment of this application, the first cell and the second cell may be located in a same cell group, and the cell group may be a master cell group or a secondary cell group. It can be learned from the foregoing descriptions in FIG. 2 that, in DC, concepts of the master cell group and the secondary cell group are introduced. The master cell group includes a cell used for random access, which is referred to as a primary cell. In addition to the primary cell, the master cell group further includes a secondary cell. For example, if a master cell group 1 includes a primary cell and a to-be-activated PUCCH secondary cell, the to-be-activated PUCCH secondary cell may be the foregoing first cell, and the primary cell included in the master cell group 1 may be the foregoing second cell. Similar to the foregoing descriptions, the secondary cell group includes a cell used for random access, which is referred to as a primary secondary cell. In addition to the primary secondary cell, the secondary cell group may further include a secondary cell. For example, if a secondary cell group 1 includes a primary secondary cell and a to-be-activated PUCCH secondary cell, the to-be-activated PUCCH secondary cell may be the foregoing first cell, and the primary secondary cell may be the foregoing second cell.

Step S305: The terminal device sends valid CSI to the network device, where the valid CSI indicates that activation of the first cell is completed. The foregoing step 305 is optional.

It should be noted that, in this embodiment of this application, the beam information of the first cell may be explained as follows: A correspondence between a beam and a reference signal may be preset, to be specific, different reference signals are set to be sent and received by using different beams. For example, a correspondence between a reference signal 1 and a beam 1, a correspondence between a reference signal 2 and a beam 2, and a correspondence between a reference signal 3 and a beam 3 are bound. In this case, the terminal device separately measures the reference signal 1, the reference signal 2, and the reference signal 3, for example, measures reference signal received power (RSRP) of the three reference signals. A reference signal whose RSRP is the largest or a reference signal whose RSRP is greater than a threshold is selected from the RSRP of the foregoing three reference signals as a reference signal that meets the condition. The reference signal that meets the condition may be considered as a beam that meets the condition in a transmission environment of the first cell, in other words, can be used for data transmission in the first cell. Then, the terminal device may report, by using the second cell, the indication information of the reference signal that meets the condition in the first cell. Alternatively, the terminal device may directly report, to the network device, the RSRP of the reference signal measured by the terminal device. The network device selects, based on the RSRP of the reference signal reported by the terminal device, the reference signal that meets the condition. The network device may determine, based on a preset correspondence between the reference signal and a beam, the beam corresponding to the reference signal that meets the condition. The beam may be referred to as a beam that meets the condition. The network device may consider that the beam that meets the condition is a beam with good transmission quality in the transmission environment of the first cell. Because beams have reciprocity, a beam that has good downlink transmission quality usually has good uplink transmission quality. Therefore, the network device may configure the TCI and/or an uplink spatial relation for the terminal device based on the beam that meets the condition. The TCI may be considered as a beam that is configured by the network device for the terminal device and that is used to receive a downlink signal, and the uplink spatial relation may be considered as a beam that is configured by the network device for the terminal device and that is used to send an uplink signal. Then, the terminal device may determine a first beam based on the uplink spatial relation configured by the network device for the terminal device, and send the valid CSI in the first cell by using the first beam. The valid CSI indicates that activation of the first cell is completed.

It should be noted that, in some descriptions of this application, an example in which the terminal device reports the indication information of the reference signal that meets the condition is used for description. However, in addition to reporting the indication information of the reference signal that meets the condition, the terminal device may further report the RSRP of the reference signal that meets the condition. Similarly, in some descriptions of this application, an example in which the terminal device reports the RSRP of the reference signal is used for description. However, in addition to reporting the RSRP of the reference signal, the terminal device may further report the indication information of the reference signal that meets the condition. This is not limited in this embodiment of this application.

In the descriptions of this application, reporting "the beam information of the first cell" is used as an example for description. The foregoing "beam information of the first cell" may actually be "reference signal information of the first cell", "CSI of the first cell", or the like. The reference signal may include a CSI-RS, a synchronization signal block (synchronization signal block, SSB), or the like. Therefore, the foregoing "beam information of the first cell" may be referred to as "SSB information of the first cell", "CSI-RS information of the first cell", or the like. The reference signal information of the first cell reported by the terminal device may be specifically an identifier of the reference signal that meets the condition or that is measured by the terminal device in the first cell, and/or the L1-RSRP of the reference signal that meets the condition or that is measured by the terminal device in the first cell. The L1-RSRP is described as follows: the L1-RSRP includes a reference signal identifier and the RSRP of the reference signal. For example, for the reference signal 1, if RSRP measured by the terminal device is 50 dBm, L1-RSRP corresponding to the reference signal 1 may include an identifier "1" of the reference signal 1, RSRP "50" of the reference signal 1, and the like. It should be noted that, for ease of understanding, an example in which the terminal device directly reports the RSRP value of the reference signal is used for description in the foregoing descriptions, and this is not limited to this embodiment of this application. For example, in an implementation, to reduce RSRP reporting overheads, an RSRP value is quantized into another value for reporting. For example, RSRP values may be classified into several grades in advance, and the terminal device directly reports a value of a grade of each RSRP value. Alternatively, only a maximum RSRP value may be reported, and only a difference between the maximum RSRP and other RSRP is reported.

The CSI of the first cell is described as follows: Because the CSI usually includes the CQI and the RSRP of the reference signal, if the terminal device measures the CSI based on the SSB, the RSRP of the reference signal included in the CSI is specifically SSB-RSRP; or if the terminal device measures the CSI based on the CSI-RS, the RSRP of the reference signal included in the CSI is specifically CSI-RS-RSRP or the like. The CQI in the CSI generally refers to downlink channel quality, and is measured by the terminal device. The network device may select a proper scheduling algorithm and a proper downlink data block size for the terminal device based on the CQI reported by the terminal device, to ensure that the terminal device obtains better downlink performance in different radio environments. Optionally, in step 305, that the terminal device reports the valid CSI to indicate that activation of the first cell is completed may be alternatively replaced with: The terminal device reports the valid CQI to indicate that activation of the first cell is completed.

For Embodiment 1, a specific example is provided, and the example at least includes:

1: For a terminal device that supports CA and a PUCCH secondary cell, after the PUCCH secondary cell is added, the network device sends a MAC activation signaling to activate the PUCCH secondary cell.

In an example, at least one PUCCH secondary cell may be added to the terminal device in advance, and a CSI measurement configuration of the PUCCH secondary cell is added. The CSI measurement configuration may include at least one CSI reporting configuration. Each CSI reporting configuration includes a CSI resource configuration used for channel measurement. The CSI reporting configuration may indicate a reporting manner corresponding to a reference signal corresponding to the CSI resource configuration included in the CSI reporting configuration, for example, whether to periodically report, a reporting type, and to-be-reported CSI of cells. In this embodiment of this application, after the PUCCH secondary cell is added to the terminal device, the PUCCH secondary cell cannot be used, in other words, the terminal device cannot perform uplink/downlink data transmission with the network device by using the secondary cell. The PUCCH secondary cell can be used only after the added PUCCH secondary cell is activated, in other words, the terminal device may perform uplink/downlink data transmission with the network device by using the activated PUCCH secondary cell.

2: If the to-be-activated PUCCH secondary cell is an unknown cell, the terminal device may measure a reference signal configured for the PUCCH secondary cell to obtain N reference signals, and the terminal device indicates the N RSs by reporting a MAC CE in the primary cell or the primary secondary cell, and/or reporting L1-RSRP results of the N RSs by using the MAC CE. The N reference signals are described as follows: The N reference signals may be all reference signals measured by the terminal device. In other words, the terminal device reports all reference signals measured by the terminal device to the network device. A subsequent reference signal selection process may be performed by a network device side. Alternatively, the terminal device may select the N reference signals from all measured reference signals. The N reference signals may be randomly selected by the terminal device, or may be selected according to a rule. For example, N reference signals whose RSRP is the best are selected, or reference signals whose RSRP is greater than a threshold are selected. This is not limited.

A process in which the terminal device measures a reference signal configured for the PUCCH secondary cell may include: The UE may measure the reference signal based on at least one CSI reporting configuration included in the CSI measurement configuration preconfigured for the PUCCH secondary cell. For example, in a possible implementation, it is set that the CSI measurement configuration includes X CSI reporting configurations. In this case, the terminal device may select Y CSI reporting configurations from the X CSI reporting configurations, where both X and Y are positive integers, and a value of Y is less than or equal to X. Each CSI reporting configuration includes the CSI resource configuration used for channel measurement. The terminal device may measure all reference signals corresponding to the Y CSI reporting configurations, and select the N RSs from the reference signals. Alternatively, a reference signal list may be separately configured for the terminal device. The reference signal list includes at least one reference signal. The terminal device may measure reference signals included in the reference signal list, and select the N RSs from the reference signal list.

According to Embodiment 1, for a PUCCH secondary cell of an unknown cell, before the PUCCH secondary cell is activated, the terminal device cannot feed back beam information by using a PUCCH of the terminal device. The terminal device reports the beam information of the PUCCH secondary cell by using a primary cell or a primary secondary cell, so that the network device can obtain the beam information of the PUCCH secondary cell, and the network device subsequently configures the TCI, the uplink spatial relation, and the like for the terminal device. Compared with a current solution, blind addition of a PUCCH secondary cell can be implemented. When the network does not know beam information of the PUCCH secondary cell, the beam information of the PUCCH secondary cell is reported by using a MAC CE of a primary cell or a primary secondary cell.

Embodiment 2

Embodiment 2 provides a beam information reporting and receiving method. The method is used to report beam information of an inactive PUCCH secondary cell. The method at least includes: A terminal device receives first activation signaling from a network device, where the first activation signaling is used to activate a first cell, and the first cell is a secondary cell that has a capability of sending a PUCCH. The terminal device measures a reference signal of the first cell to determine first beam information. The terminal device initiates random access to the network device in the first cell by using a first random access resource and a first random access preamble that are associated with the first beam information.

Figure 4A:
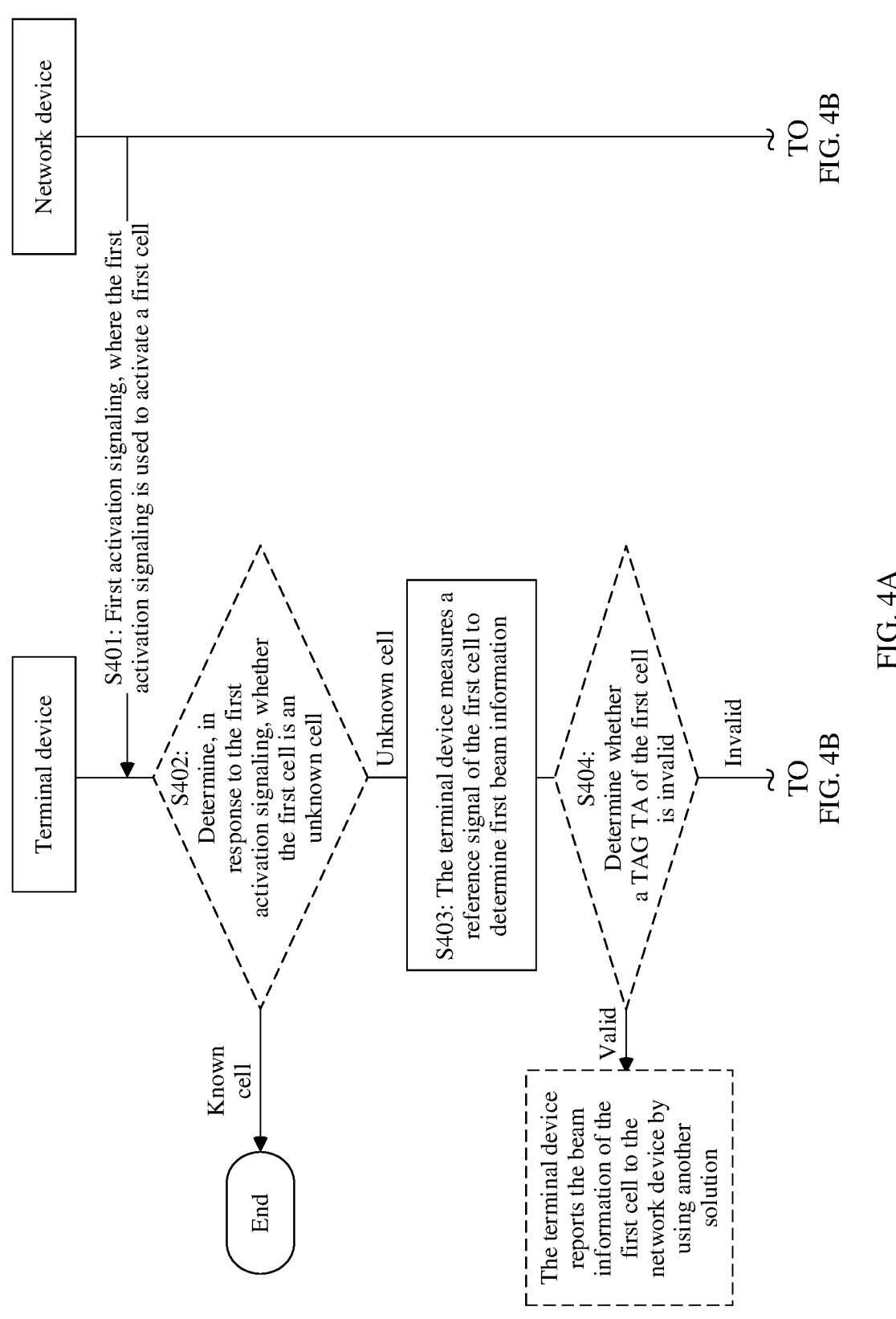

As shown in FIG. 4A and FIG. 4B, a procedure of the beam information reporting and receiving method is provided. The procedure includes at least the following steps.

Step S401: A network device sends first activation signaling to a terminal device, where the first activation signaling is used to activate a first cell, and the first cell is a secondary cell that has a capability of sending a PUCCH.

Step S402: The terminal device determines, in response to the first activation signaling, whether the first cell is an unknown cell; and if the first cell is the unknown cell, performs the following step S403. If the first cell is a known cell, the procedure ends. The foregoing step S402 is optional.

Step S403: The terminal device measures a reference signal of the first cell to determine first beam information.

For the foregoing process of step S401 to step S403, refer to the process of step S301 to step S303 in Embodiment 1, and details are not described again.

Step S404: The terminal device determines whether a timing advance group (timing advance group, TAG) timing advance (TA) of the first cell is invalid; and if the TAG TA of the first cell is invalid, performs the following step S404 to report the beam information of the first cell. Otherwise, the beam information of the first cell may be reported to the network device by using another solution, for example, the solution in Embodiment 1. The foregoing step S404 is optional.

For example, the TAG TA of the first cell may be considered as valid in the following condition: If a time alignment timer associated with a TAG of the first cell is running, the TA of the first cell is considered as valid. Otherwise, the TA of the first cell is considered as invalid. Optionally, TA invalidness may also be referred to as TA expiration or the like. In a wireless communication process, if a TA on a terminal device side is invalid, it usually means that the terminal device and the network device cannot strictly maintain time synchronization. In this case, the terminal device needs to re-initiate random access, and the network device allocates a valid TA to the terminal device in a random access process of the terminal device. According to an existing protocol, random access to a secondary cell can be triggered only by a PDCCH order. A random access process of the secondary cell may be as follows: The terminal device reports beam information to a network; the network device selects a beam from the beam information reported by the terminal device, and sends a PDCCH order to the terminal device in the beam; and the terminal device initiates random access through triggering of the foregoing PDCCH order to obtain a valid TA. However, in this embodiment of this application, when determining that the TA of the first cell is invalid, the terminal device directly initiates random access based on a first random access resource and a first random access preamble that are associated with the beam information of the first cell, in other words, implicitly reports the beam information of the first cell to the network device. Alternatively, the valid TA allocated by the network device to the terminal device may be obtained in the random access process. Compared with a process in which the beam information of the secondary cell is reported and then the PDCCH order is sent by the network device to trigger random access of the terminal device, which is specified in a current protocol, a process in which the terminal device obtains the valid TA is simplified, thereby reducing signaling overheads.

Step S405: The terminal device selects the first random access resource and the first random access preamble from at least one random access resource and at least one random access preamble that are associated with the first beam information. The foregoing step S405 is optional. The foregoing step S405 is mainly applied to a scenario in which there are a plurality of random access resources and a plurality of random access preambles that are associated with the first beam information, the terminal device needs to select the first random access resource from the plurality of random access resources, and select the first random access preamble from the plurality of random access preambles. If there is one random access resource and one random access preamble that are associated with the first beam, step S405 does not need to be performed. A random access resource associated with the first beam is the first random access resource, and a random access preamble associated with the first beam is the first random access preamble.

Step S406: The terminal device initiates random access to the network device in the first cell by using the first random access resource and the first random access preamble that are associated with the first beam information.

In step S406, the network device may receive the first random access preamble from the terminal device in the first cell by using the first random access resource. The network device may consider that the first beam information associated with the first random access resource and the first random access preamble is the beam information of the first cell.

Optionally, the terminal device initiates the random access process directly based on the first random access preamble and the first random access resource that are associated with the first beam information without being triggered by the PDCCH order of the network device. A process in which the terminal device determines the first random access resource and the first resource access preamble that are associated with the first beam information, and initiates random access includes but is not limited to the following two solutions:

Solution 1: After determining the first beam information, the terminal device may determine, in a common random access resource pool, the first random access resource and the first random access preamble that are associated with the first beam information. Because the common random access resource pool may be used by at least one terminal device, this solution may also be referred to as a contention-based random access process. In an example, the contention-based random access process includes four steps, which are specifically:

1: The terminal device sends a random access preamble on a random access channel.

2: After detecting the random access preamble, the network device sends a downlink random access response, where the downlink random access response includes at least the following information:

number of the received random access preamble;

TA information;

uplink resource location indication information allocated to the terminal device; and temporarily allocated cell radio network temporary identifier (C-RNTI).

3: After receiving the random access response, the terminal device sends an uplink message on an allocated uplink resource as indicated by the random access response.

4: The network device receives the uplink message from the terminal device, and returns a conflict resolution message to the successfully connected terminal device.

Solution 2: A dedicated reference signal list and a dedicated random access resource are configured for the terminal device, where the dedicated reference signal list and the dedicated random access resource are used by the terminal device to report the beam information to the network device. The terminal device may measure the reference signal included in the dedicated reference signal list to determine the first beam information, determine, in a dedicated random access resource pool based on a correspondence between the dedicated reference signal list and the dedicated resource pool, the first random access resource and the first random access preamble that correspond to the first beam information. In this embodiment of this application, a process in which the terminal device initiates random access based on the dedicated random access resource pool is not limited.

Step S407: The terminal device sends valid CSI to the network device, where the valid CSI indicates that activation of the first cell is completed. The foregoing step S407 is optional.

For Embodiment 2, a specific example is provided. The method includes:

1: For a terminal device that supports CA and a PUCCH secondary cell, after the PUCCH secondary cell is added, the network device sends MAC activation signaling to activate the PUCCH secondary cell.

2: If the to-be-activated PUCCH secondary cell is an unknown cell, the terminal device independently initiates contention-based random access. The process is as follows: The terminal device measures a reference signal of the to-be-activated PUCCH secondary cell, selects a first reference signal, and initiates random access based on a first random access resource and a first random access preamble that are associated with the first reference signal.

The terminal device may measure the reference signal based on a preconfigured reference signal measurement configuration or a reference signal list of the to-be-activated PUCCH secondary cell. A process is similar to the foregoing process, and details are not described again.

Optionally, before step 2, the terminal device may further determine whether a TAG TA of the to-be-activated PUCCH secondary cell expires. If the TAG TA expires, the solution in Embodiment 2 of this application is used. Otherwise, another solution is used, for example, the solution in Embodiment 1.

According to the foregoing descriptions, for a PUCCH secondary cell of an unknown cell, the terminal device cannot feed back beam information of the PUCCH secondary cell on a PUCCH of the PUCCH secondary cell. The terminal device selects a random access preamble and a random access resource that are associated with the beam information of the PUCCH secondary cell to initiate random access, to implicitly report the beam information of the PUCCH secondary cell to the network device. According to the solution in Embodiment 3, blind addition of the PUCCH secondary cell can be implemented. When the network does not know the beam information of the PUCCH secondary cell, the beam information of the PUCCH secondary cell is indicated to the network by initiating random access.

Embodiment 3

Embodiment 3 provides a beam information reporting and receiving method. The method may be used to report beam information to a network device in an activation process of a PUCCH secondary cell. The method at least includes: A terminal device receives first activation signaling from the network device, where the first activation signaling is used to activate a first cell, and the first cell is a secondary cell that has a capability of sending a PUCCH.

When reporting of beam information of the first cell is preconfigured in a second cell, the terminal device periodically sends the beam information of the first cell to the network device in the second cell, where the second cell is a primary cell or a primary secondary cell of the first cell. When a preset condition is met, the terminal device stops periodically reporting all or a part of the beam information of the first cell in the second cell.

As shown in FIG. 5, a procedure of the beam information reporting and receiving method is provided. The procedure includes at least the following steps.

Step S501: A network device sends first activation signaling to a terminal device, where the first activation signaling is used to activate a first cell, and the first cell is a secondary cell that has a capability of sending a PUCCH.

Step S502: When reporting of a beam information of the first cell is preconfigured in a second cell, the terminal device periodically sends the beam information of the first cell to the network device in the second cell, where the second cell is a primary cell or a primary secondary cell of the first cell. Correspondingly, when sending the first activation signaling, the network device needs to determine whether the first cell is an unknown cell. If the first cell is the unknown cell, the network device may configure a TCI, an uplink spatial relation, and/or the like for the first cell based on the beam information of the first cell.

For example, that reporting of a beam of the first cell is preconfigured in a second cell may specifically include: Reporting of the beam of the first cell configured in the second cell is periodic, in other words, the beam information of the first cell is periodically reported by using the second cell. For a specific execution process, refer to the following descriptions in step 503 and step 504. Alternatively, if reporting of the beam of the first cell configured in the second cell is aperiodic, the terminal device may aperiodically report the beam information of the first cell in the second cell. In an example, the network device may send trigger signaling aperiodically reported to the terminal device. When receiving the trigger signaling, the terminal device may report the beam information of the first cell once by using the second cell.

In this embodiment of this application, time for aperiodically reporting the beam information of the first cell should be not earlier than, in other words, later than or equal to the following time: slot n+first time T, where the slot n is a slot in which the terminal device receives the activation signaling for activating the first cell. The network needs to ensure that at least one time of aperiodically reporting the beam is not earlier than the foregoing specified time. For example, in an example, a time point at which the terminal device receives the activation signaling of the first cell in the slot n is 14:33:35 on Jan. 12, 2021, and a value of the first time T is 15 milliseconds. In this case, it needs to be ensured that at least one time of aperiodically reporting the beam information of the first cell is not earlier than 14:33:50 on Jan. 12, 2021. In an example, the first time T satisfies the following formula:

$$T_{HARQ} + K + T_{FirstSSB\_MAX} + 15 * T_{SMTC\_MAX} + 8 * T_{rs} + T_{L1\text{-}RSRP, \, measure}.$$

$T_{HARQ}$ represents time between downlink transmission that carries the first activation signaling and time when a corresponding HARQ feedback is fed back.

K represents a time constant. For example, a value of K may be 3 ms.

$T_{FirstSSB\_MAX}$ represents time from $$n + \frac{T_{HARQ} + 3 \, \text{ms}}{NR \, \text{slot length}}$$

to ending of a first full SSB. In a single-band (intra-band) carrier aggregation scenario, all activated SCells and to-be-activated SCells in a same frequency band are transmitting SSBs in a same slot. In a multi-band (inter-band) carrier aggregation scenario, a to-be-activated SCell is transmitting an SSB.

$T_{SMTC\_MAX}$ represents SSB-based measurement timing configuration (SMTC) periodicity of the to-be-activated secondary cell, or a larger value of the SMTC periodicity of the to-be-activated SCell and an SMTC periodicity of the activated SCell in the same frequency band (band).

Trs represents the SMTC periodicity of a to-be-activated cell. If the SMTC periodicity is not configured, Trs is an SMTC periodicity configured in a measurement target having a same frequency and subcarrier spacing (SCS). Otherwise, Trs is a specified value.

$T_{L1\text{-}RSRP, \, measure}$ represents L1-RSRP measurement time.

In another example, if the first cell is located in an FR1, the first time T satisfies the following formula:

$$T_{HARQ} + K + T_{FirstSSB\_MAX} + T_{SMTC\_MAX} + T_{rs} + T_{L1\text{-}RSRP, \, measure}.$$

For a meaning of each parameter in the formula, refer to the foregoing descriptions. Details are not described again.

Step S503: When a preset condition is met, the terminal device stops periodically reporting all or a part of the beam information of the first cell in the second cell.

Step S504: The terminal device sends valid CSI to the network device, where the valid CSI indicates that activation of the first cell is completed. The foregoing step S504 is optional.

In Embodiment 3, the first cell may be an unknown cell or a known cell. This is not limited. Because reporting of the beam of the first cell is preconfigured in the second cell, the terminal device may report the beam information of the first cell to the network device by using the second cell. A key point in this embodiment of this application is that when the preset condition is met, the preset condition indicates at least that the network device has obtained the beam information of the first cell. In this case, the terminal device may stop reporting the beam information of the first cell to the network device by using the second cell. In some examples, the preset condition may include at least one of the following:

1: The terminal device receives the TCI of the first cell and/or the uplink spatial relation indication of the first cell from the network device. The network device allocates the TCI of the first cell and/or the uplink spatial relation of the first cell to the terminal device only when receiving the beam information of the first cell from the terminal device. Therefore, when the terminal device receives the TCI of the first cell and/or the uplink spatial relation of the first cell from the network device, it indicates that the network device has obtained the beam information of the first cell. Therefore, the terminal device may stop reporting the beam information of the first cell to the network device.

2: The terminal device sends first piece of valid CSI of the first cell in the second cell. The first piece of valid CSI of the first cell includes the beam information of the first cell. For this condition, it may be understood that, regardless of a receiving status of the network device, valid beam information of the first cell is not continuously sent as long as the valid beam information of the first cell is sent to the network device.

3: The terminal device sends the valid CSI to the network device, where the valid CSI indicates that activation of the first cell is completed. When activation of the first cell is completed, the terminal device may report the beam information of the first cell to the network device by using the first cell. Therefore, reporting of the beam information of the first cell by using the second cell may be stopped.

4: The terminal device receives a PDCCH order or valid TA information from the network device, where the PDCCH order is used to trigger random access of the terminal device, the PDCCH order includes the beam information of the first cell, and the valid TA information is allocated by the network device to the terminal device in a random access process of the terminal device. For this condition, it may be understood that the PDCCH order includes the beam that is used for random access and that is allocated by the network device to the first cell, and the network device allocates the beam that is used for random access and that is in the first cell to the terminal device only when the terminal device reports the beam information of the first cell. Therefore, the PDCCH order may be used as an indication that the network device has received the beam information of the first cell. Further, the valid TA information is allocated by the network device to the terminal device in a process in which the terminal device initiates random access based on the PDCCH order. Therefore, the valid TA information may also be used as an indication that the network device has received the beam information of the first cell.

In an example, reporting of the beam of the first cell is configured in the second cell. When the foregoing preset condition is met, the terminal device may stop reporting the beam information of the first cell by using the second cell. When the first cell becomes an inactive cell and the first cell is activated again, the terminal device may resume reporting the beam information of the first cell in the second cell, and stop reporting the beam information of the first cell in the second cell again when the preset condition is met.

In Embodiment 3, in a process in which the terminal device activates the first cell, the PUCCH of the first cell cannot be used. The network device may obtain the beam information of the first cell by configuring reporting of the beam of the to-be-activated first cell in the second cell. In addition, when reporting of the beam of the first cell configured in the second cell is periodic beam reporting, a condition for the terminal device to stop reporting, first time for aperiodically reporting the beam information, and the like are specified.

For Embodiment 3, a specific example is provided, and the example at least includes:

1: For a terminal device that supports CA and a PUCCH secondary cell, after the PUCCH secondary cell is added, the network device sends a MAC activation signaling to activate the PUCCH secondary cell.

2: Reporting of a beam of the to-be-activated PUCCH secondary cell is preconfigured in a primary cell or a primary secondary cell. If periodic beam reporting is configured, when the following event occurs in an activation process of the PUCCH secondary cell, the terminal device automatically stops periodically reporting beam information of the to-be-activated PUCCH secondary cell in the primary cell or the primary secondary cell:

1: Receive a TCI and/or an uplink spatial relation of the to-be-activated PUCCH secondary cell that are/is sent by the network device.

2: Report first piece of valid beam information of the to-be-activated PUCCH secondary cell by using the primary cell or the primary secondary cell. For example, the first piece of valid beam information may be L1-RSRP of a reference signal.

3: Report the valid CSI on a PUCCH of the to-be-activated PUCCH secondary cell, where the valid CSI indicates that the activation process is completed.

4: Receive a PDCCH order, valid TA information, or the like sent by the network device.

Alternatively, if aperiodic beam reporting is configured, time at which the terminal device reports the beam information of the PUCCH secondary cell in the primary cell or the primary secondary cell by using a preconfigured resource should be not earlier than, in other words, later than or equal to the following time: slot n in which the terminal device receives the activation signaling of the PUCCH secondary cell+first time.

According to the solution in Embodiment 3, blind addition of the PUCCH secondary cell can be implemented. When the network device does not know the beam information of the PUCCH secondary cell, the terminal device may report the beam information of the to-be-activated PUCCH secondary cell by using the primary cell or the primary secondary cell. In addition, in a current solution, when periodic beam information reporting is configured in the primary cell or the primary secondary cell, even if the terminal device has completed activation of the PUCCH secondary cell and the PUCCH secondary cell reports the beam information on its own PUCCH, a PUCCH resource of the primary cell or the primary secondary cell is still occupied to report the beam information of the PUCCH secondary cell. A solution for stopping reporting the beam information of the PUCCH secondary cell in the primary cell or the primary secondary cell is also generally: deleting, through an RRC signaling reconfiguration, reporting of the beam of the PUCCH secondary cell configured in the primary cell or the primary secondary cell. This means that the RRC signaling reconfiguration is required each time the PUCCH secondary cell is activated, resulting in large signaling overheads and a long delay. However, in Embodiment 3, in the activation process of the PUCCH secondary cell, when the preset condition is met, the terminal device may consider that the network device has obtained the beam information of the PUCCH secondary cell. In this case, the terminal device automatically stops occupying the PUCCH resource of the primary cell or the primary secondary cell for reporting, and the terminal device performs reporting by using a PUCCH resource of the terminal device. Compared with a solution of stopping reporting the beam information of the PUCCH secondary cell in the primary cell or the primary secondary cell through the RRC signaling reconfiguration, signaling overheads can be reduced, and the delay can be shortened. However, when aperiodic beam information reporting of the PUCCH secondary cell is configured in the primary cell or the primary secondary cell, it is difficult for the network device to control time at which the terminal device reports the beam information of the PUCCH secondary cell. However, in Embodiment 3, the foregoing first time is specified, so that the network device controls the time at which the terminal device reports the beam information of the PUCCH secondary cell by using the primary cell or the primary secondary cell.

The methods provided in embodiments of this application are described above in detail with reference to FIG. 1 to FIG. 5. Apparatuses provided in embodiments of this application are described in detail below with reference to FIG. 6 and FIG. 7. It should be understood that descriptions of the apparatus embodiments correspond to descriptions of the method embodiments. Therefore, for content that is not described in detail, refer to the descriptions in the foregoing method embodiments.

FIG. 6 is an example block diagram of an apparatus 600 according to an embodiment of this application. The apparatus 600 is configured to implement functions of the terminal device or the network device in the foregoing method embodiments. The apparatus may be a software unit or a circuit system. The circuit system may include a chip, or may include a chip and another discrete component. The apparatus includes a communication unit 601, configured to communicate with the outside. The apparatus may further include a processing unit 602, configured to perform processing.

In an example, the apparatus 600 is configured to implement functions of the terminal device in Method Embodiment 1. The apparatus 600 may be a terminal device, or may be a chip or a circuit configured in a terminal device. The communication unit 601 is configured to perform a transceiver-related operation on a terminal device side in Method Embodiment 1, and the processing unit 602 is configured to perform a processing-related operation on the terminal device side in Method Embodiment 1.

For example, the communication unit 601 is configured to receive first activation signaling from a network device, where the first activation signaling is used to activate a first cell, and the first cell is a secondary cell that has a capability of sending a physical uplink control channel PUCCH. The processing unit 602 is configured to measure a reference signal of the first cell to determine beam information of the first cell. The communication unit 601 is further configured to send layer 2 signaling to the network device by using a second cell, where the layer 2 signaling includes the beam information of the first cell, and the second cell is a primary cell or a primary secondary cell corresponding to the first cell.

Optionally, the layer 2 signaling includes media access control control element MAC CE signaling.

Optionally, the processing unit 602 is further configured to: determine, in response to the first activation signaling, whether the first cell is an unknown cell; and if the first cell is the unknown cell, perform the step of measuring a reference signal of the first cell to determine beam information of the first cell.

Optionally, the communication unit 601 is further configured to send valid channel state information CSI to the network device, where the valid CSI indicates that activation of the first cell is completed.

Optionally, the measuring a reference signal of the first cell to determine beam information of the first cell includes: measuring the reference signal of the first cell, to obtain a measurement result of the reference signal; and selecting, from the reference signal of the first cell, a reference signal whose measurement result meets a condition, where the beam information of the first cell includes indication information of the reference signal whose measurement result meets the condition, and/or layer 1 reference signal received power L1-RSRP of the reference signal whose measurement result meets the condition.

Optionally, the measuring a reference signal of the first cell includes: if a CSI measurement configuration is preconfigured in the first cell, measuring the reference signal included in the CSI measurement configuration preconfigured in the first cell; or if a first reference signal list is preconfigured in the first cell, measuring the reference signal included in the first reference signal list preconfigured in the first cell.

In another example, the apparatus 600 is configured to implement functions of the network device in Method Embodiment 1. The apparatus 600 may be a network device, or may be a chip or a circuit configured in a network device. The communication unit 601 is configured to perform a transceiver-related operation on a network device side in Method Embodiment 1, and the processing unit 602 is configured to perform a processing-related operation on the network device side in Method Embodiment 1.

For example, the communication unit 601 is configured to send first activation signaling to a terminal device, where the first activation signaling is used to activate a first cell, and the first cell is a secondary cell that has a capability of sending a PUCCH. The communication unit 601 is further configured to receive layer 2 signaling from the terminal device by using a second cell, where the layer 2 signaling includes beam information of the first cell, and the second cell is a primary cell or a primary secondary cell of the first cell.

Optionally, the layer 2 signaling includes MAC CE signaling. Optionally, the first cell is an unknown cell.

Optionally, the communication unit 601 is further configured to receive valid CSI from the terminal device, where the valid CSI indicates that activation of the first cell is completed.

Optionally, the beam information of the first cell includes indication information of a reference signal whose measurement result meets a condition, and/or L1-RSRP of the reference signal whose measurement result meets the condition.

In an example, the apparatus 600 is configured to implement functions of the terminal device in Method Embodiment 2. The apparatus 600 may be a terminal device, or may be a chip or a circuit configured in a terminal device. The communication unit 601 is configured to perform a transceiver-related operation on a terminal device side in Method Embodiment 2, and the processing unit 602 is configured to perform a processing-related operation on the terminal device side in Method Embodiment 2.

For example, the communication unit 601 is configured to receive first activation signaling from a network device, where the first activation signaling is used to activate a first cell, and the first cell is a secondary cell that has a capability of sending a PUCCH. The processing unit 602 is configured to measure a reference signal of the first cell to determine first beam information. The processing unit 602 is further configured to initiate random access to the network device in the first cell by using a first random access resource and a first random access preamble that are associated with the first beam information.

Optionally, the processing unit 602 is further configured to select the first random access resource and the first random access preamble from at least one random access resource and at least one random access preamble that are associated with the first beam information.

Optionally, the processing unit 602 is further configured to: determine, in response to the first activation signaling, whether the first cell is an unknown cell; and if the first cell is the unknown cell, perform the step of measuring a reference signal of the first cell to determine first beam information.

Optionally, the communication unit 601 is further configured to send valid CSI to the network device, where the valid CSI indicates that activation of the first cell is completed.

Optionally, the measuring a reference signal of the first cell to determine first beam information includes: measuring the reference signal of the first cell to obtain a measurement result of reference signal; and selecting, from the reference signal of the first cell, a reference signal whose reference signal measurement result meets a condition, where the first beam information includes indication information of the reference signal whose measurement result meets the condition, and/or L1-RSRP of the reference signal whose measurement result meets the condition.

Optionally, the processing unit 602 is further configured to: determine whether a timing advance TAG timing advance TA of the first cell is invalid; and if the TAG TA of the first cell is invalid, perform the step of initiating random access to the network device in the first cell by using a first random access resource and a first random access preamble that are associated with the first beam information.

In an example, the apparatus 600 is configured to implement functions of the network device in Method Embodiment 2. The apparatus 600 may be a network device, or may be a chip or a circuit configured in a network device. The communication unit 601 is configured to perform a transceiver-related operation on a network device side in Method Embodiment 2, and the processing unit 602 is configured to perform a processing-related operation on the network device side in Method Embodiment 2.

For example, the communication unit 601 is configured to send first activation signaling to a terminal device, where the first activation signaling is used to activate a first cell, and the first cell is a secondary cell that has a capability of sending a PUCCH. The processing unit 602 is configured to receive, in the first cell by using a first random access resource, a first random access preamble from the terminal device, where first beam information associated with the first random access resource and the first random access preamble is beam information of the first cell.

Optionally, the first beam information is associated with at least one random access resource and at least one random access preamble, the at least one random access resource includes the first random access resource, and the at least one random access preamble includes the first random access preamble.

Optionally, the first cell is an unknown cell.

Optionally, the communication unit 601 is further configured to receive valid CSI from the terminal device, where the valid CSI indicates that activation of the first cell is completed.

Optionally, the first beam information includes indication information of a reference signal whose measurement result meets a condition, and/or L1-RSRP of the reference signal whose measurement result meets the condition.

Optionally, a TAG TA of the first cell is invalid.

In an example, the apparatus 600 is configured to implement functions of the terminal device in Method Embodiment 3. The apparatus 600 may be a terminal device, or may be a chip or a circuit configured in a terminal device. The communication unit 601 is configured to perform a transceiver-related operation on a terminal device side in Method Embodiment 3, and the processing unit 602 is configured to perform a processing-related operation on the terminal device side in Method Embodiment 3.

For example, the communication unit 601 is configured to receive first activation signaling from a network device, where the first activation signaling is used to activate a first cell, and the first cell is a secondary cell that has a capability of sending a PUCCH. The communication unit 601 is further configured to: when reporting of beam information of the first cell is preconfigured in a second cell, periodically send the beam information of the first cell to the network device in the second cell, where the second cell is a primary cell or a primary secondary cell of the first cell. The processing unit 602 is configured to: when a preset condition is met, stop periodically reporting all or a part of the beam information of the first cell in the second cell.

Optionally, the preset condition includes at least one of the following:

the terminal device receives a transmission configuration indicator TCI and/or an uplink spatial relation indication from the network device;

the terminal device sends first piece of valid CSI of the first cell in the second cell;

the terminal device sends the valid CSI to the network device, where the valid CSI indicates that activation of the first cell is completed; and the terminal device receives a physical downlink control channel PDCCH order or valid TA information from the network device, where the PDCCH order is used to trigger random access of the terminal device, the PDCCH order includes the beam information of the first cell, and the valid TA information is allocated by the network device to the terminal device in a random access process of the terminal device.

Optionally, the first cell is an unknown cell or a known cell.

Optionally, the communication unit 601 is further configured to send the valid CSI to the network device, where the valid CSI indicates that activation of the first cell is completed.

In an example, the apparatus 600 is configured to implement functions of the network device in Method Embodiment 3. The apparatus 600 may be a network device, or may be a chip or a circuit configured in a network device. The communication unit 601 is configured to perform a transceiver-related operation on a network device side in Method Embodiment 3, and the processing unit 602 is configured to perform a processing-related operation on the network device side in Method Embodiment 3.

For example, the communication unit 601 is configured to send first activation signaling to a terminal device, where the first activation signaling is used to activate a first cell, and the first cell is a secondary cell that has a capability of sending a PUCCH. The communication unit 601 is configured to: when reporting of beam information of the first cell is preconfigured in a second cell, receive the beam information of the first cell from the terminal device in the second cell, where the second cell is a primary cell or a primary secondary cell of the first cell.

Optionally, the first cell is an unknown cell or a known cell.

Optionally, the communication unit 601 is further configured to receive valid CSI from the terminal device, where the valid CSI indicates that activation of the first cell is completed.

Optionally, the processing unit 602 is configured to determine whether the first cell is the unknown cell; and if the first cell is the unknown cell, configure a transmission configuration indicator TCI and/or an uplink spatial relation for the first cell.

In embodiments of this application, division into the units is an example, is merely logical function division, and may be other division during actual implementation. In addition, functional units in embodiments of this application may be integrated into one processor, or each of the units may exist alone physically, or two or more units may be integrated into one unit. The integrated unit may be implemented in a form of hardware, or may be implemented in a form of a software functional unit.

It can be understood that in the foregoing embodiment, functions of the communication unit may be implemented by a transceiver, and functions of the processing unit may be implemented by a processor. The transceiver may include a transmitter and/or a receiver, to respectively implement functions of a sending unit and/or a receiving unit. Descriptions are provided below by way of example with reference to FIG. 7.

Figure 7:
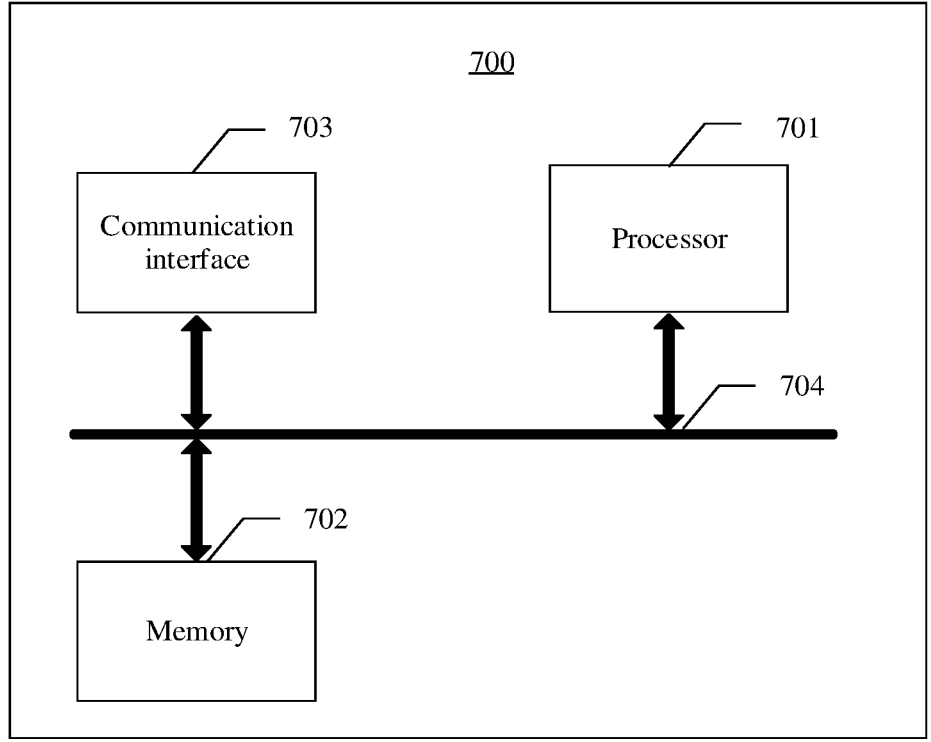
FIG. 7 is a schematic diagram of another structure of an apparatus according to an embodiment of this application.

A communication apparatus 700 shown in FIG. 7 includes at least one processor 701. The communication apparatus 700 may further include at least one memory 702, configured to store program instructions and/or data. The memory 702 is coupled to the processor 701. The coupling in this embodiment of this application may be indirect coupling or a communication connection between apparatuses, units, or modules in an electrical form, a mechanical form, or another form, and is used for information exchange between the apparatuses, the units, or the modules. The processor 701 may cooperate with the memory 702, the processor 701 may execute the program instructions stored in the memory 702, and the at least one memory 702 may be included in the processor 701.

The apparatus 700 may further include a communication interface 703, configured to communicate with another device through a transmission medium, so that the communication apparatus 700 can communicate with the another device. In this embodiment of this application, the communication interface may be a transceiver, a circuit, a bus, a module, or a communication interface of another type. In this embodiment of this application, when the communication interface is the transceiver, the transceiver may include an independent receiver and an independent transmitter, or may be a transceiver integrated with a transceiver function, or may be an interface circuit.

It should be understood that a connection medium between the processor 701, the memory 702, and the communication interface 703 is not limited in this embodiment of this application. In this embodiment of this application, in FIG. 7, the memory 702, the processor 701, and the communication interface 703 are connected through a communication bus 704, and the bus is represented by a bold line in FIG. 7. A connection manner between other components is merely an example for description, and is not a limitation. The bus may include an address bus, a data bus, a control bus, and the like. For ease of representation, in FIG. 7, only one bold line is used for representation, but it does not mean that there is only one bus, only one type of bus, or the like.

In an example, the apparatus 700 may be the terminal device in Method Embodiment 1, and the processor 701 of the apparatus 700 is configured to read a computer program stored in the memory 702, to perform the following operations: receiving first activation signaling from a network device, where the first activation signaling is used to activate a first cell, and the first cell is a secondary cell that has a capability of sending a physical uplink control channel PUCCH; measuring a reference signal of the first cell to determine beam information of the first cell; and sending layer 2 signaling to the network device by using a second cell, where the layer 2 signaling includes the beam information of the first cell, and the second cell is a primary cell or a primary secondary cell corresponding to the first cell. For details, refer to the descriptions in Method Embodiment 1, and details are not described again.

In another example, the apparatus 700 may be the network device in Method Embodiment 1, and the processor 701 of the apparatus 700 is configured to read a computer program stored in the memory 702, to perform the following operations: sending first activation signaling to a terminal device, where the first activation signaling is used to activate a first cell, and the first cell is a secondary cell that has a capability of sending a PUCCH; and receiving layer 2 signaling from the terminal device by using a second cell, where the layer 2 signaling includes beam information of the first cell, and the second cell is a primary cell or a primary secondary cell of the first cell. For details, refer to the descriptions in Method Embodiment 1, and details are not described again.

In another example, the apparatus 700 may be the terminal device in Method Embodiment 2, and the processor 701 of the apparatus 700 is configured to read a computer program stored in the memory 702, to perform the following operations: receiving first activation signaling from a network device, where the first activation signaling is used to activate a first cell, and the first cell is a secondary cell that has a capability of sending a PUCCH; measuring a reference signal of the first cell to determine first beam information; and initiating random access to the network device in the first cell by using a first random access resource and a first random access preamble that are associated with the first beam information. For specific details, refer to the descriptions in Method Embodiment 2, and details are not described again.

In another example, the apparatus 700 may be the network device in Method Embodiment 2, and the processor 701 of the apparatus 700 is configured to read a computer program stored in the memory 702, to perform the following operations: sending first activation signaling to the terminal device, where the first activation signaling is used to activate a first cell, and the first cell is a secondary cell that has a capability of sending a PUCCH; and receiving, in the first cell by using a first random access resource, a first random access preamble from the terminal device, where first beam information associated with the first random access resource and the first random access preamble is beam information of the first cell. For specific details, refer to the descriptions in Method Embodiment 2, and details are not described again.

In another example, the apparatus 700 may be the terminal device in Method Embodiment 3, and the processor 701 of the apparatus 700 is configured to read a computer program stored in the memory 702, to perform the following operations: receiving first activation signaling from a network device, where the first activation signaling is used to activate a first cell, and the first cell is a secondary cell that has a capability of sending a PUCCH; when reporting of beam information of the first cell is preconfigured in a second cell, periodically sending the beam information of the first cell to the network device in the second cell, where the second cell is a primary cell or a primary secondary cell of the first cell; and when a preset condition is met, stopping periodically reporting all or a part of the beam information of the first cell in the second cell. For specific details, refer to the descriptions in Method Embodiment 3, and details are not described again.

In another example, the apparatus 700 may be the network device in Method Embodiment 3, and the processor 701 of the apparatus 700 is configured to read a computer program stored in the memory 702, to perform the following operations:

sending first activation signaling to a terminal device, where the first activation signaling is used to activate a first cell, and the first cell is a secondary cell that has a capability of sending a PUCCH; and when reporting of beam information of the first cell is preconfigured in a second cell, receiving the beam information of the first cell from the terminal device in the second cell, where the second cell is a primary cell or a primary secondary cell of the first cell. For specific details, refer to the descriptions in Method Embodiment 3, and details are not described again.

An embodiment of this application further provides a computer-readable storage medium, including a program. When the program is run by a processor, the methods in the foregoing method embodiments are performed.

A computer program product is provided. The computer program product includes computer program code. When the computer program code is run on a computer, the computer is enabled to implement the methods in the foregoing method embodiments.

A chip includes a processor. The processor is coupled to a memory, and the memory is configured to store a program or instructions. When the program or the instructions are executed by the processor, the chip is enabled to perform the methods in the foregoing method embodiments.

A system includes the terminal device and the network device in the foregoing embodiments, or a system includes the apparatus for implementing the functions of the terminal device in the foregoing embodiments and the apparatus for implementing the functions of the network device in the foregoing embodiments.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

In embodiments of this application, the memory may be a non-volatile memory, such as a hard disk drive (hard disk drive, HDD) or a solid-state drive (solid-state drive, SSD), or may be a volatile memory (volatile memory), such as a random access memory (random access memory, RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

All or some of the methods in embodiments of this application may be implemented by using software, hardware, firmware, or any combination thereof. When software is used to implement the methods, all or a part of the methods may be implemented in a form of a computer program product. The computer program product includes one or more computer instructions. When the computer program instructions are loaded and executed on the computer, the procedures or functions according to embodiments of this application are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, an SSD), or the like.

It is clearly that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. An apparatus, comprising a processor and a memory, wherein the memory stores instructions, and when the processor executes the instructions, the apparatus is enabled to perform:

receiving, first activation signaling, wherein the first activation signaling indicates to activate a first cell, and the first cell is a secondary cell that has a capability of sending a physical uplink control channel (PUCCH); and when reporting of beam information of the first cell is preconfigured in a second cell, sending the beam information of the first cell in the second cell, wherein the second cell is a primary cell or a primary secondary cell of the first cell.

2. The apparatus according to claim 1, wherein the first cell is an unknown cell.

3. The apparatus according to claim 1, the apparatus is further enabled to perform:

sending valid channel state information (CSI), wherein the valid CSI indicates that activation of the first cell is completed.

4. The apparatus according to claim 1, wherein the first cell is a known cell.

5. The apparatus according to claim 1, wherein the second cell is the primary cell of the first cell.

6. The apparatus according to claim 1, wherein the second cell is the primary secondary cell of the first cell.

7. A method, comprising:

sending, by a network device, first activation signaling to a terminal device, wherein the first activation signaling indicates to activate a first cell, and the first cell is a secondary cell that has a capability of sending a physical uplink control channel (PUCCH); and when reporting of beam information of the first cell is preconfigured in a second cell, receiving, by the network device, the beam information of the first cell from the terminal device in the second cell, wherein the second cell is a primary cell or a primary secondary cell of the first cell.

8. The method according to claim 7, wherein the first cell is an unknown cell.

9. The method according to claim 7, further comprising:

receiving, by the network device, valid channel state information (CSI) from the terminal device, wherein the valid CSI indicates that activation of the first cell is completed.

10. The method according to claim 7, further comprising:

determining, by the network device, whether the first cell is an unknown cell; and when it is determined that the first cell is the unknown cell, configuring, by the network device, a transmission configuration indicator (TCI) and/or an uplink spatial relation for the first cell.

11. The method according to claim 7, wherein the first cell is a known cell.

12. The method according to claim 10, wherein configuring, by the network device, the TCI and/or the uplink spatial relation for the first cell comprises:

configuring, by the network device, the TCI for the first cell.

13. The method according to claim 10, wherein configuring, by the network device, the TCI and/or the uplink spatial relation for the first cell comprises:

configuring, by the network device, the uplink spatial relation for the first cell.

14. An apparatus, comprising a processor and a memory, wherein the memory stores instructions, and when the processor executes the instructions, the apparatus is enabled to perform:

sending first activation signaling, wherein the first activation signaling indicates to activate a first cell, and the first cell is a secondary cell that has a capability of sending a physical uplink control channel (PUCCH); and when reporting of beam information of the first cell is preconfigured in a second cell, receiving the beam information of the first cell in the second cell, wherein the second cell is a primary cell or a primary secondary cell of the first cell.

15. The apparatus according to claim 9, wherein the first cell is an unknown cell.

16. The apparatus according to claim 14, the apparatus is further enabled to perform:

receiving valid channel state information (CSI), wherein the valid CSI indicates that activation of the first cell is completed.

17. The apparatus according to claim 14, wherein when the processor executes the instructions, the apparatus is further enabled to perform:

determining whether the first cell is an unknown cell; and when it is determined the first cell is the unknown cell, configuring a transmission configuration indicator TCI and/or an uplink spatial relation for the first cell.

18. The apparatus according to claim 14, wherein the first cell is a known cell.

19. The apparatus according to claim 17, wherein configuring the TCI and/or the uplink spatial relation for the first cell comprises:

configuring the TCI for the first cell.

20. The apparatus according to claim 17, wherein configuring the TCI and/or the uplink spatial relation for the first cell comprises:

configuring the uplink spatial relation for the first cell.

* * * * *